(12) United States Patent
Carter et al.

(10) Patent No.: US 6,370,437 B1
(45) Date of Patent: Apr. 9, 2002

(54) DYNAMIC PREDICTION FOR PROCESS CONTROL

(75) Inventors: Malcolm Edward Carter, Harlow; Otakar Fojt, York; Michael Maurice Dodson, Heslington, all of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/243,303

(22) Filed: Feb. 2, 1999

(30) Foreign Application Priority Data

Jun. 23, 1998 (GB) .............................................. 9813454

(51) Int. Cl.[7] .............................................. G05B 13/02
(52) U.S. Cl. .............................. 700/52; 700/51; 706/62
(58) Field of Search ........................ 700/51, 52, 53–54; 706/58; 702/191; 370/230

(56) References Cited

U.S. PATENT DOCUMENTS

| | | | | |
|---|---|---|---|---|
| 4,414,629 A | * | 11/1983 | Waite | 705/28 |
| 5,510,976 A | | 4/1996 | Tanaka et al. | |
| 5,730,144 A | * | 3/1998 | Katz et al. | 600/526 |
| 5,748,851 A | * | 5/1998 | Iokibe et al. | 706/58 |
| 5,815,413 A | * | 9/1998 | Hively et al. | 702/191 |
| 5,890,142 A | * | 3/1999 | Tanimura et al. | 706/12 |
| 6,125,105 A | * | 9/2000 | Edwards et al. | 370/230 |

FOREIGN PATENT DOCUMENTS

JP          8314530          11/1993

OTHER PUBLICATIONS

Holger, Kantz and Thomas Schreiber, "Non Linear time series analysis" pp. 44 to 46 Cambridge nonlinear science series 7, 1997, Cambridge University Press.

The Theory of Deterministic Chaos and its Application in Analysis of Endoscopic sympathectomy data. pp. 58 to 65 and 68 to 73. Doctoral Thesis, Otakar Fojt, Brno University, Czech Republic, Dec. 1997.

* cited by examiner

*Primary Examiner*—William Grant
*Assistant Examiner*—Ronald D Hartman, Jr.
(74) *Attorney, Agent, or Firm*—Lee, Mann, Smith, McWilliams, Sweeney & Ohlson

(57) ABSTRACT

Product data from a manufacturing process is analysed using techniques adapted from the study of chaos. Future values of a series of product data are predicted and an attractor structure is determined from the product data. This enables the manufacturing process to be monitored, controlled and analysed. Action can be taken to modify the manufacturing process using the results from the prediction and attractor structure to reduce costs and improve performance and efficiency.

22 Claims, 19 Drawing Sheets

FLAGS TRUTH TABLE AND INTERPRETATION

| prediction | | result condition | | change | | Interpretation | Flag opportunity |
|---|---|---|---|---|---|---|---|
| met | not met | good | bad | large | small | | |
| 1 | | 1 | | 1 | | In control but risks present / OK if change deliberated otherwise / not in control and new influence | Quality measure / Change effectiveness or quality measure |
| | 1 | | 1 | 1 | | In control and need for improvement / not in control and new influence | Quality measure / Conditions change |
| 1 | | 1 | | | 1 | In control and low risk / OK if change deliberate otherwise / Not in control and new influence | Quality measure / Change effectiveness or quality measure |
| | 1 | | 1 | | 1 | In control and need for improvement / Not in control and new influence | Quality measure / Conditions change |

*Fig. 8b*

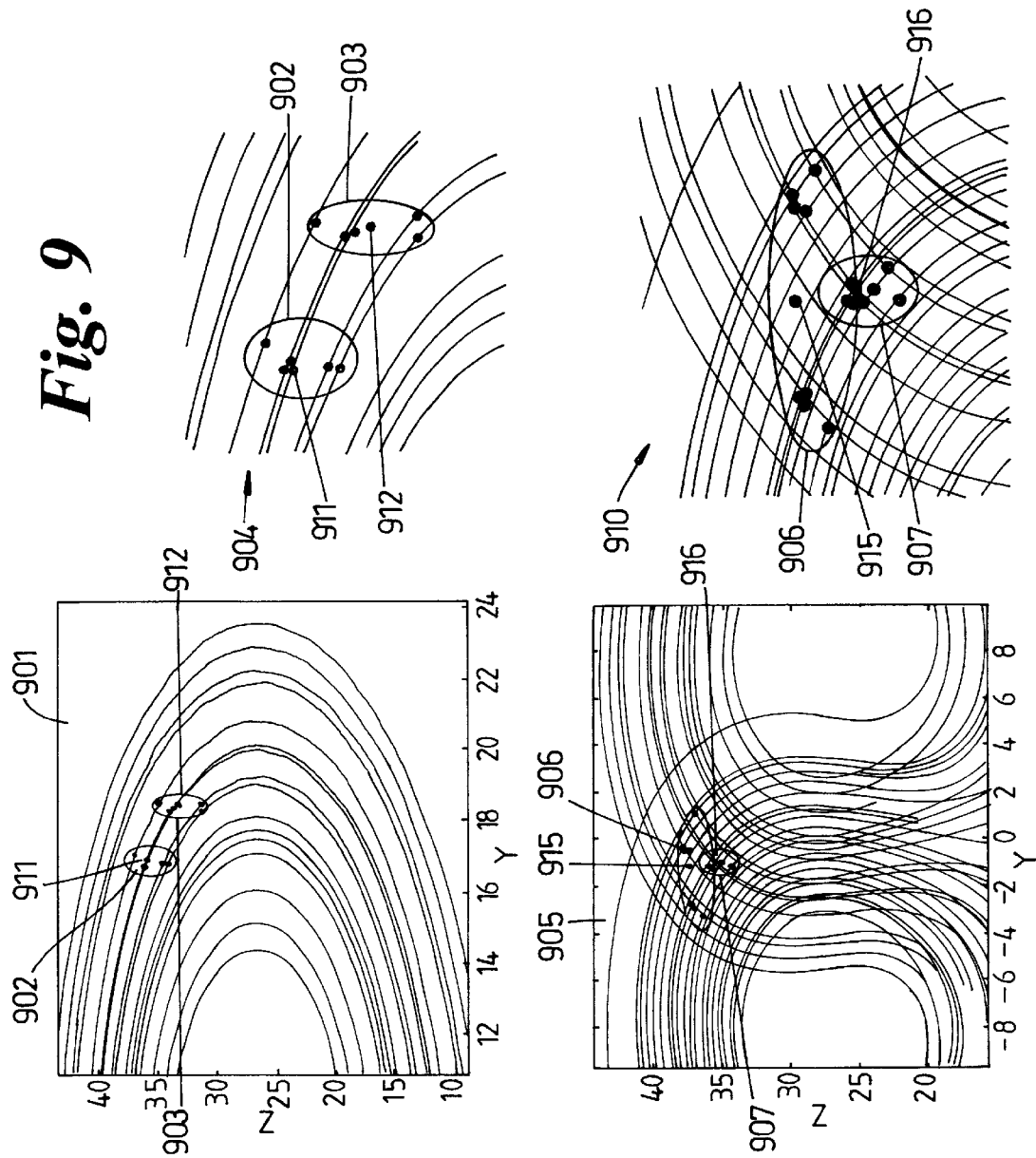

Fig. 18
Prediction of Optoelectronic Data
File : roa_shipping_data.mat;Parameter 14
Prediction base : increasing from 2000 points up
Prediction length: 1 step
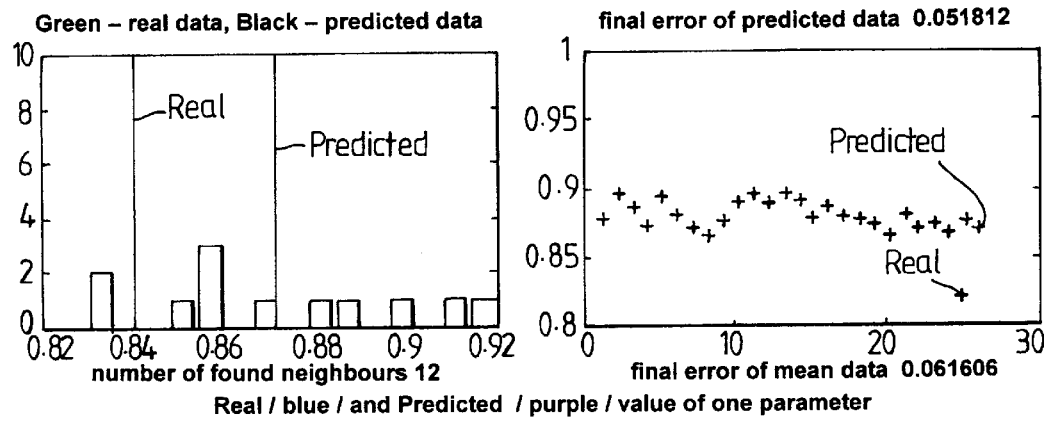
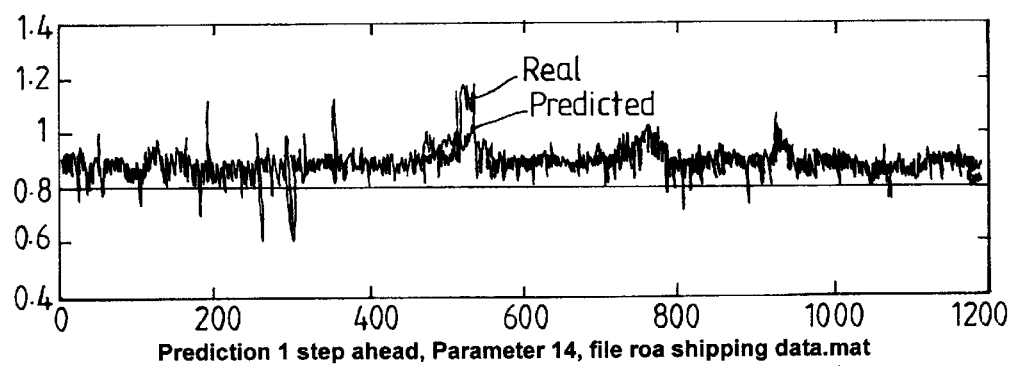
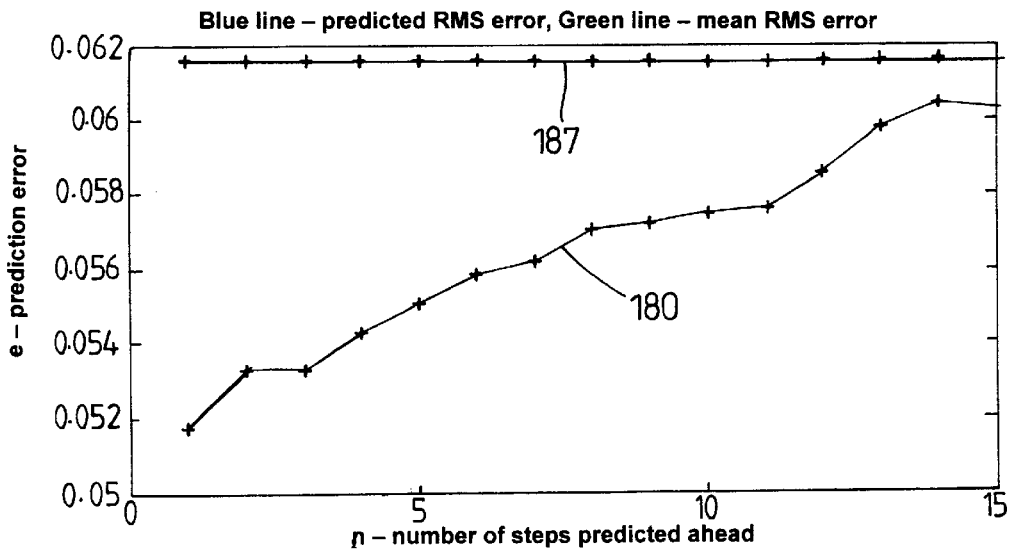
Prediction was for tests from 2001 – 3180; Prediction length: 1 – 15 steps

DYNAMIC PREDICTION FOR PROCESS CONTROL

BACKGROUND OF THE INVENTION

1. Field of the Invention

This invention relates a computer system and method for predicting a future value of a series of product data.

2. Description of the Prior Art

Previously the approach of statistical process control (SPC) has been used to analyse manufacturing and other processes. Data about products produced in a manufacturing process are analysed in order to make inferences about the manufacturing process itself. For example, if the manufacturing process was for making confectionery, samples of confectionery would be drawn off at certain time intervals and analysed. Measurements for various parameters would be taken, for example, the weight of the confectionery items, the sugar content or other factors. Data from the samples would then be used to make inferences about the whole population of manufactured products and the manufacturing process. Typically, statistics such as the mean and standard deviation or range were calculated for the sample data for each parameter, and these statistics compared for different samples. For example, if the mean was observed to move outside a certain threshold range an "out of control" flag would be triggered to alert the factory staff to a problem in the manufacturing process. If trends were observed in the data, for example, an increase in the mean, the user could be alerted to this fact and then an investigation carried out.

Several problems with these statistical approaches to process control are known. For example, an inference is made that the data sets fit a standard type of distribution, such as a normal or Poisson distribution. However, this is rarely the case for process control data in which many outlying values are typically observed and which are often bimodal or show other irregular distributions. Also, data is obtained from a small sample of the manufactured products and used to make inferences about the whole population of manufactured products. This means that the statistics calculated using SPC type methods often are not an accurate reflection of the manufacturing process being analysed. Where products exhibit a high degree of consistency of performance then statistical examination of data is adequate, however, some products such as electric circuits have been found to exhibit performance results that do not fit statistical distributions, even though the data from these products fall within predetermined performance margins.

Process control is a difficult problem for manufacturers; it involves analysing the state of the manufacturing process and knowing how to adjust the manufacturing process in the light of the analysis in order to achieve efficiency and desired outputs. The manufacturer is faced with the problem of producing products that are within certain "tolerance" limits with respect to various parameters (for example, weight of confectionery bars) whilst at the same time reducing waste. For example, in order to manufacture confectionery bars that are all of a given minimum stated weight, the majority of the bars have to be produced with a weight that is greater than that minimum. If the manufacturer were able to produce confectionery bars all with a particular weight a great cost saving could be made. However, because of the limitations of current methods of process control this cannot be achieved. Often factors to do with the manufacturing process itself are too difficult to be measured practically and so measurements from the product themselves are taken. These measurements are sometimes analysed statistically and by making simple comparisons but information about the process is not provided quickly enough and with enough precision to enable the manufacturing process to be adjusted. The information provided about the process is about the "recent past" behaviour of that process and this means that there is always a "time lag" between receiving data about the process and taking any corrective action.

Another problem is that test data that is routinely collected in production tests on the factory floor are often not suitable for statistical analysis. This is because the data sets are often small, incomplete, discontinuous and because they contain outlying values. However, this type of data is typically all that is available for process control. Many manufacturers measure their products against a predetermined test regime and hence a wealth of data is routinely generated. Often because no suitable method for analysing this kind of data is available, the data is simply stored away "for the record" and this is a waste of resources. Methods that can be used to analyse this type of data are typically time consuming and do not allow the data to be reviewed in close to real time.

Another problem in process control is being able to deal with the fact that the inputs to the process vary. For example, if components are supplied to a manufacturer for assembly into a final product, those components may vary from batch to batch and from supplier to supplier. However, it is very difficult to analyse how the components vary and this is time consuming and expensive. Also, it is difficult to determine what effect variations in the components may have on the manufacturing process that is being controlled. These problems increase for more complex products that involve many components, such as circuit boards. For this reason, many manufacturers aim to limit variability by attempting to strictly control all the initial build conditions which includes the supply base. This is often not possible if it is necessary to vary the supplier for other reasons, for example to attain a good price or to achieve continuity of supply. Many manufacturers of electronic systems rely heavily upon their suppliers to ensure that materials and components used in the fabrication of products are compliant to specification. Often, electronic components are not examined before they enter factories. Investment programmes for test equipment at the component level have shown that it is not practical to distinguish between batches of components and also that the instances of non-compliant components are negligible. For these reasons many manufacturing companies have wound down their incoming component inspection processes. Instances do occur where manufactured products exhibit changes in performance that are attributed to changes in the components but no effective way of dealing with this problem has been found.

A particular problem in process control involves the situation where a manufacturing process is set up in a particular location, such as the USA, and it is required to set up the same process in a new location, say Canada, in order to produce the same quality of product with the same efficiency. It is typically very difficult to set up the new process in such a way that the same quality of product is produced with the same efficiency because of the number of factors that influence the process.

Failure mode effect analysis is another problem in process control. In this case, a failure occurs in the manufacturing or other process and it is required to analyse why this has occurred and what corrective action should be taken. Current methods for dealing with failure mode effect analysis include schematic examination and fault injection techniques but these are not satisfactory because of the problems with the data mentioned above.

JP8314530 describes a failure prediction apparatus which uses chaos theory based methods. A physical quantity, such as an electrical signal, showing the condition of a single installation is measured repeatedly at regular intervals in order to collect a time series of data. This time series of data is then used to reconfigure an attractor which is used to predict future values of the time series. These predicted values are compared with observed values in order to predict failure of the installation. This system is disadvantageous in many respects. The input data must be repeated measurements from a single apparatus taken at regular intervals. However, in practice it is often not possible to obtain measurements at regular intervals. Also, JP8314530 does not address the problems of dealing with product data and non time series data such as product data obtained from many products which will vary. Also, JP8314530 is concerned with failure prediction only and not with other matters such as monitoring performance and detecting changes in behaviour of a process. Moreover, JP8314530 does not describe the process of identifying nearest neighbour vectors and determining corresponding vectors for these.

It is accordingly an object of the present invention to provide a computer system and method for predicting a future value of a series of product data which overcomes or at least mitigates one or more of the problems noted above.

SUMMARY OF THE INVENTION

According to a first aspect of the present invention there is provided a method of predicting a future value of a series of product data comprising the steps of:
  (i) forming a set of vectors wherein each vector comprises a number of successive values of the series of product data;
  (ii) identifying from said set of vectors, a current vector which comprises a most recent value of the series of product data;
  (iii) identifying at least one nearest neighbour vector from said set of vectors, wherein for each nearest neighbour vector a measure of similarity between that nearest neighbour vector and the current vector is less than a threshold value;
  (iv) for each nearest neighbour vector, determining a corresponding vector, each corresponding vector comprising values of the series of product data that are a specified number of data values ahead of the data values of the nearest neighbour vector in said series of product data; and
  (v) calculating the predicted future value on the basis of at least some of the corresponding vector(s); wherein said series of product data comprises a plurality of values each measured from a different product.

A corresponding computer system for predicting a future value of a series of product data comprises:
  (i) a processor arranged to form a set of vectors wherein each vector comprises a number of successive values of the series of product data;
  (ii) an identifier arranged to identify from said set of vectors, a current vector which comprises a most recent value of the series of product data;
  (iii) a second identifier arranged to identify at least one nearest neighbour vector from said set of vectors, wherein for each nearest neighbour vector a measure of similarity between that nearest neighbour vector and the current vector is less than a threshold value;
  (iv) a determiner arranged to determine, for each nearest neighbour vector, a corresponding vector, each corresponding vector comprising values of the series of product data that are a specified number of data values ahead of the data values of the nearest neighbour vector in said series of product data; and
  (v) a calculator arranged to calculate the predicted future value on the basis of at least some of the corresponding vector(s); wherein said series of product data comprises a plurality of values each measured from a different product.

This provides the advantage that product data from a manufacturing process can be analysed and used to provide a prediction about performance of the process in the future. This removes any "time lag" between obtaining data about the manufacturing process and allows immediate modification of the manufacturing process to reduce waste. This reduces manufacturing costs and improves efficiency. The manufacturing process can be effectively controlled using the product data despite the fact that this data may not fit a recognised statistical distribution and is not suitable for statistical analysis. The effects of inputs to the manufacturing process, such as new suppliers and new batches of raw materials is monitored or controlled without the need to carry out measurements or tests on the inputs. In the case that the manufacturing process fails the failure situation can be analysed by comparing the predicted and actual product data.

According to another aspect of the present invention there is provided a method of substantially determining an attractor structure from a series of product data comprising the steps of:
  (i) forming a set of vectors wherein each vector comprises a number of successive values of the series of product data;
  (ii) calculating a set of eigenvectors and a set of eigenvalues from said set of vectors using the method of principal components analysis; and
  (iii) transforming the said set of vectors on the basis of said set of eigenvectors; wherein said series of product data comprises a plurality of values each measured from a different product.

A corresponding computer system for substantially determining an attractor structure from a series of product data comprises:
  (i) a processor arranged to form a set of vectors wherein each vector comprises a number of successive values of the series of product data;
  (ii) a calculator arranged to calculate a set of eigenvectors and a set of eigenvalues from said set of vectors using the method of principal components analysis; and
  (iii) a transformer arranged to transform the said set of vectors on the basis of said set of eigenvectors; wherein said series of product data comprises a plurality of values each measured from a different product.

This provides the advantage that product data can be analysed by determining an attractor structure. If no effective attractor structure is identified for a given parameter then this parameter is known not to be a good input for the prediction process. This enables the costs of obtaining product data to be reduced because ineffective product data parameters can be eliminated. Another advantage is that two separate manufacturing processes that are intended to produce the same product can be compared by comparing their attractor structures. Adjustments can then be made to the processes until the attractor structures are substantially identical and this helps to ensure that the same quality of product is produced in both manufacturing sites with the same efficiency.

Preferably said series of product data comprise values that were measured at irregular time intervals. This provides the advantage that the prediction and analysis processes are effective for product data that is measured at irregular time intervals.

BRIEF DESCRIPTION OF THE DRAWINGS

FIG. 8b is an example of a look up table for various combinations of predicted and actual results.

FIG. 9 shows part of the structure of a known attractor, the Lorenz attractor.

FIG. 18 is another example of a display from the prediction algorithm program.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Definitions product data—product data comprises information about items produced from a manufacturing process. The items may be whole products or components of products.

series of product data—an ordered number of items of information about items produced from a manufacturing process where the intervals between the items of information are not necessarily regular.

current vector—a vector which represents the current observation in a series of product data, or an observation in the series of product data after which a prediction is required.

It has unexpectedly been discovered that product data from manufacturing processes can successfully be analysed using methods adapted from chaotic systems analysis. Product data is measured at irregular time intervals and contains discontinuities, outlying values and is often not suitable for statistical analysis. Also, product data often comprises values each measured from a different product rather than a sequence of measurements of the same parameter from the same object. For these reasons, product data has not previously been thought suitable for successful analysis using methods from chaotic system analysis.

Chaotic systems are deterministic but are very sensitive to initial conditions. For example, in a chaotic system, a small random error grows exponentially and can eventually completely alter the end result. Given an initial state for a chaotic system it becomes essentially impossible to predict where the state will reside in say 40 iterations hence. However, short term prediction for chaotic systems is not ruled out.

Figure 11:
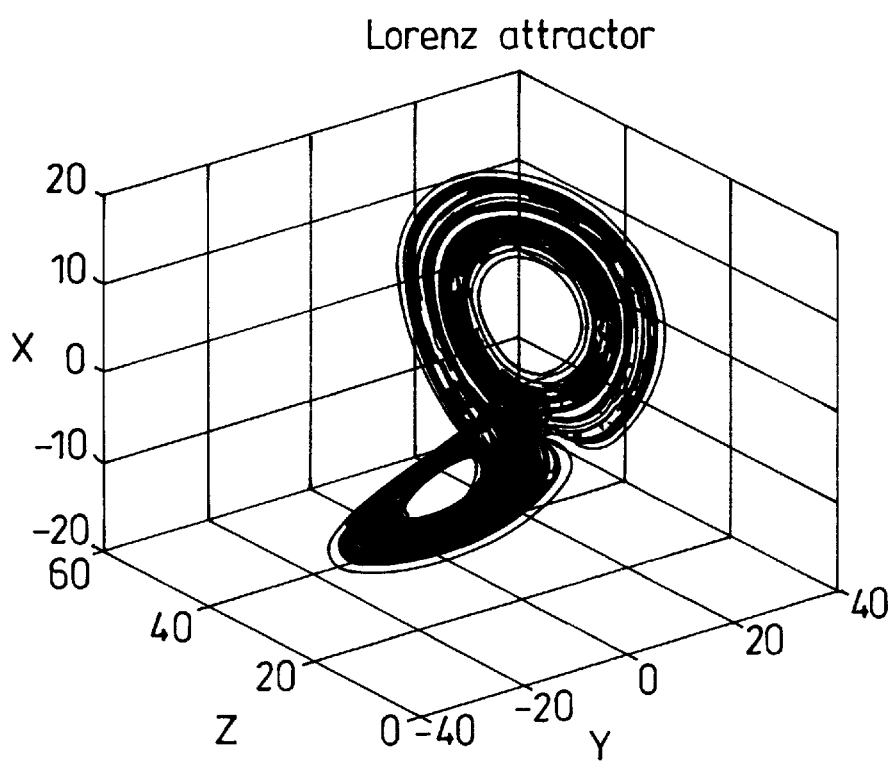
FIG. 11 illustrates the structure of the known Lorenz attractor.
Figure 16A:
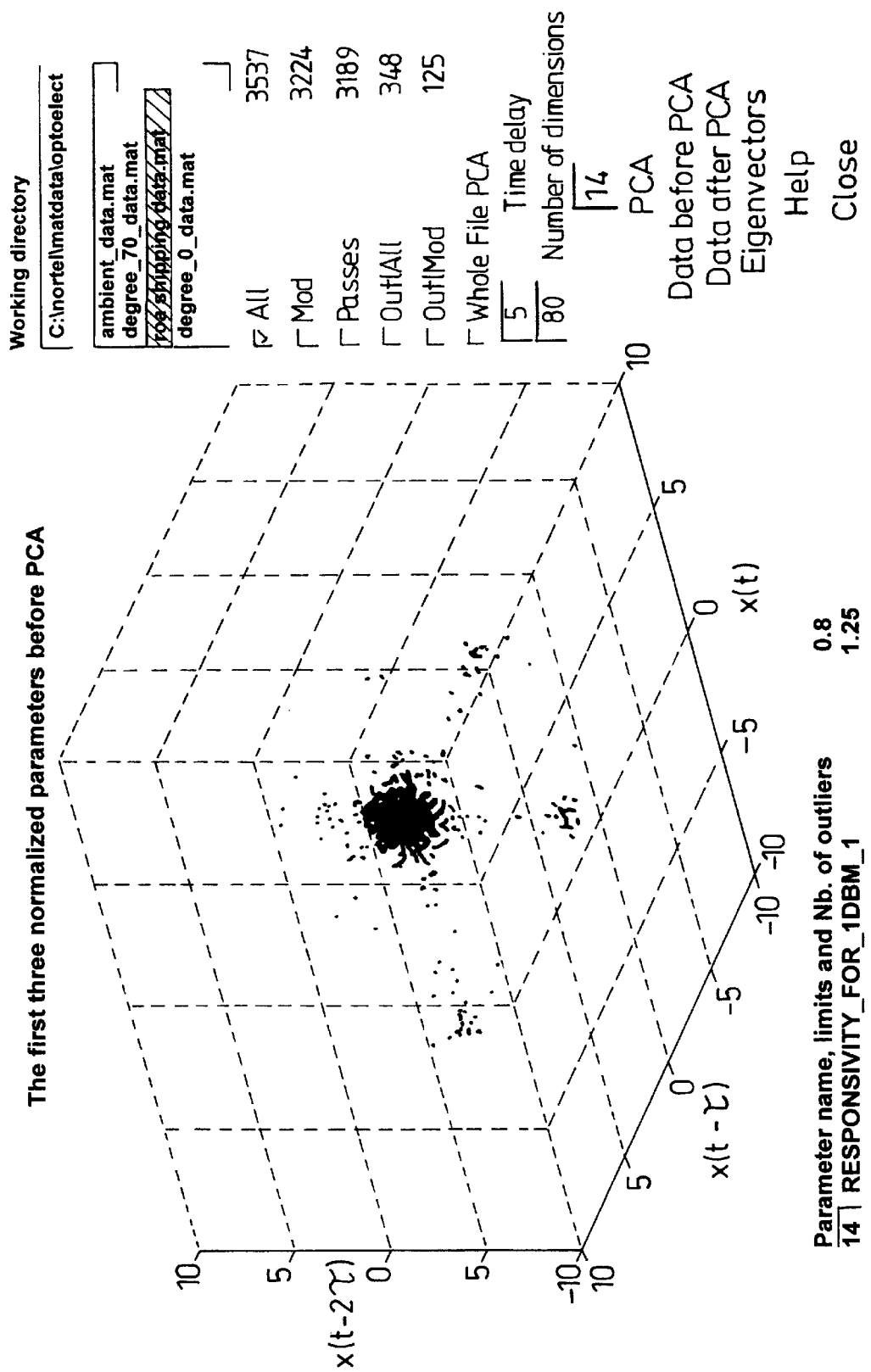
FIG. 16a is an example of a display from the principal components analysis program showing the data before application of the principal components analysis.
Figure 16B:
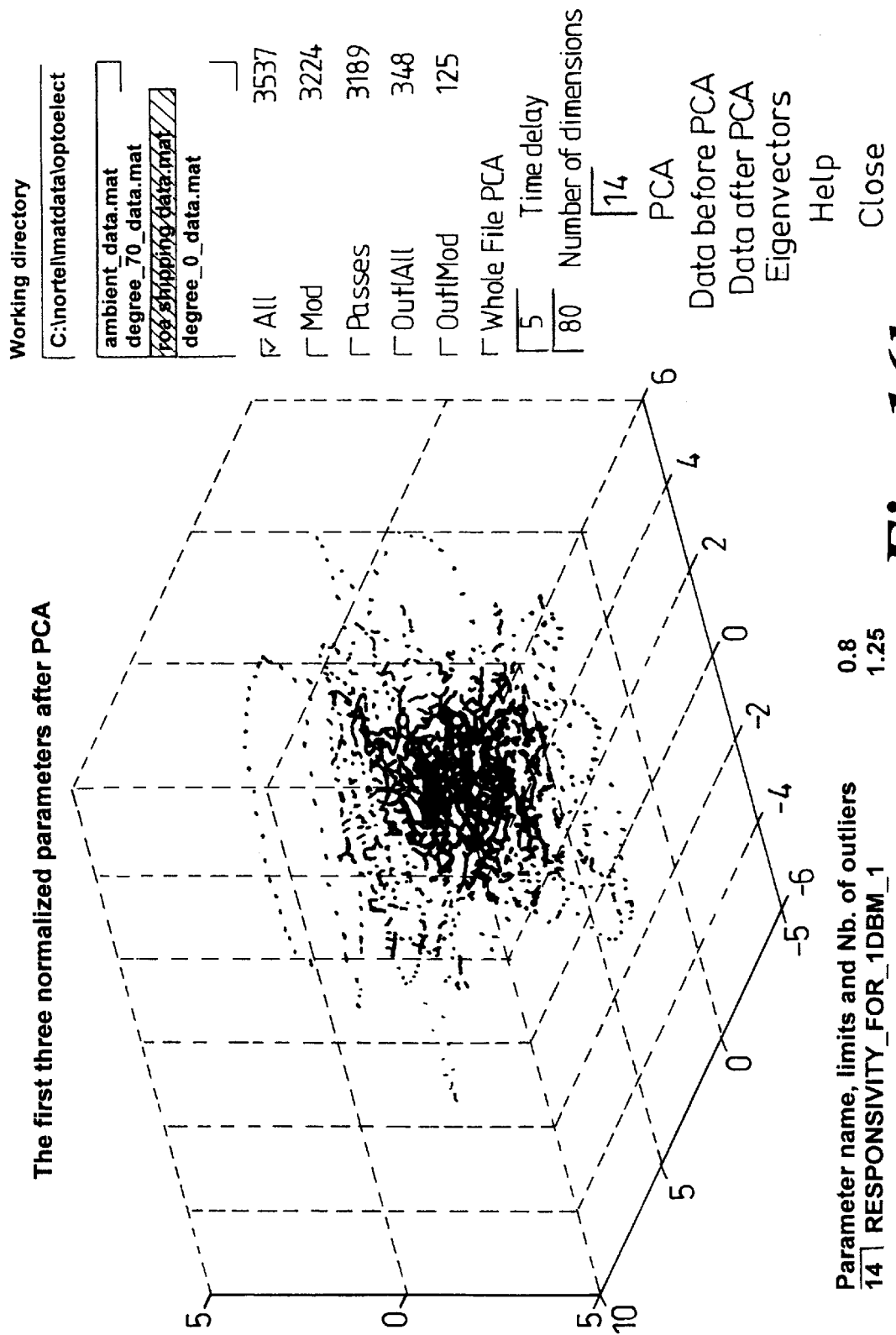
FIG. 16b is an example of a display from the principal components analysis program showing the data after application of the principal components analysis.

A chaotic system typically produces a time series that appears complex, irregular and random. However, the behaviour of a chaotic system can often be described by an attractor which is a bounded subset of a region of phase space, as is known to the skilled person in the art. An example of a known attractor, the Lorenz attractor is shown in FIG. 11. It has unexpectedly been found that product data can reveal attractor structures. For example, FIG. 16b shows an example of an attractor structure revealed from product data.

In the present invention, a factory or manufacturing process is assumed to be a non-linear close coupled dynamical system. Product data from the manufacturing process is assumed to contain information about the dynamical system and is analysed using techniques adapted from dynamical systems analysis. Ideally, the controller of a manufacturing process desires the manufacturing process to fit a fixed, periodic or quasiperiodic function. In this situation, the manufacturing process is easy to monitor and control because the process fits a simple function. However this is not the case in practice where it is found that manufacturing processes are very difficult to control and predict. It has unexpectedly been found that product data sometimes show characteristics of low order chaotic systems where the order of the system is between about 3 and 8. In this situation, global stability but local instability is observed, with sensitive dependence on initial conditions and with divergence of nearby trajectories in the attractor structure.

Figure 1:
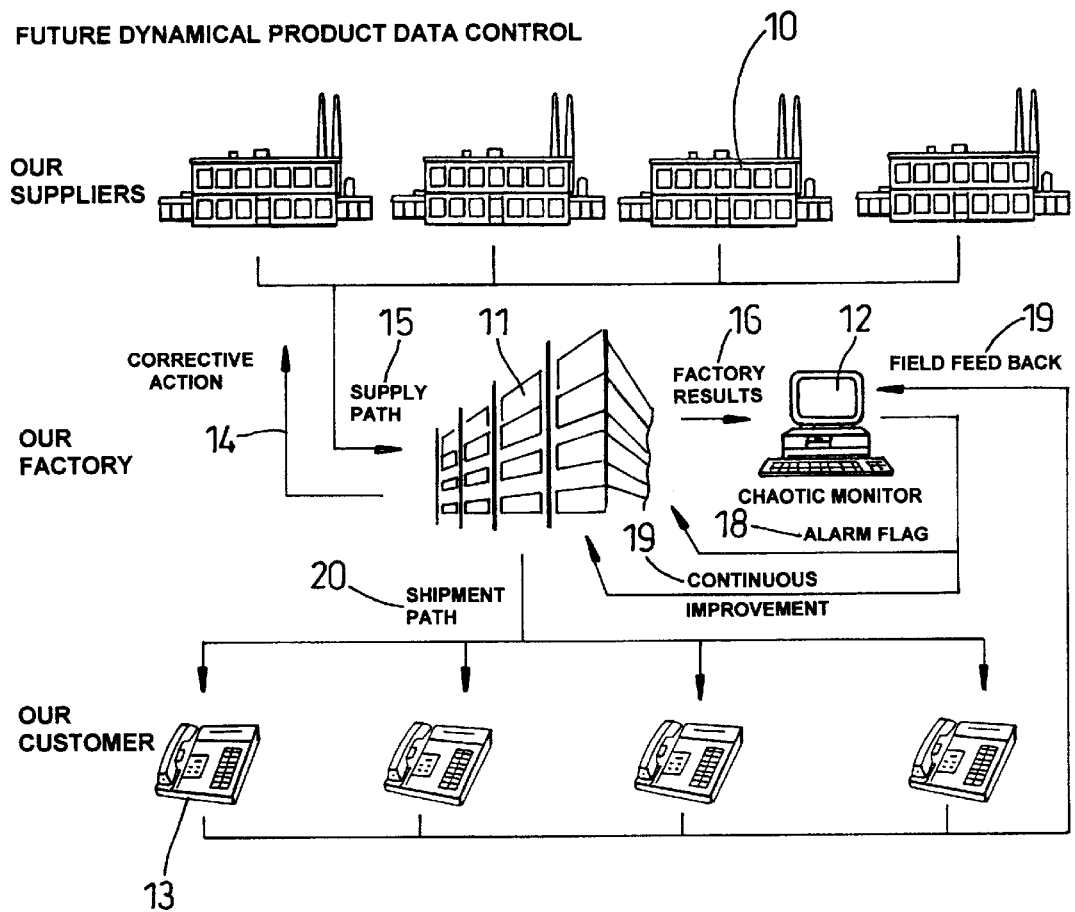
FIG. 1 is a schematic flow diagram of a manufacturing process.

FIG. 1 shows how the invention is used to monitor results from a factory. Suppliers 10 provide components to a factory 11 via a supply path 15. The factory 11 assembles the components to form products. Each product is measured or tested to obtain values of one or more parameters. These measurements comprise part of a number of factory results 16. The factory results 16 comprise any information related to the performance and output of the manufacturing process. For example, factory results 16 can comprise information about events in the factory and information about suppliers and any other factors which affect the manufacturing process.

The factory results 16 are provided to a computer system 12 or other suitable information processing apparatus. The computer system analyses the input factory results using techniques adapted from those suitable for analysing data sets that exhibit chaotic behaviour. The factory results form a series of product data. The computer system forecasts future values of that series of product data and then monitors new actual values of the series that are provided as input. The actual and predicted values are compared and on the basis of this comparison one of a number of flags 18 are provided as output from the computer system to a user. For example, these can comprise alarm flags which alert the user to the fact that the factory results 16 differ unexpectedly from the predicted factory results.

The products produced by the factory 11 are provided by a shipment path 20 to customers 13. Information from the customers 13 about the products is fed back to the computer system 12 as shown by field feed back arrow 17 in FIG. 1. This information is analysed by the computer system and used to predict future performance of the manufacturing process.

Outputs from the computer system also comprise descriptions of the process occurring in the factory. On the basis of this information, adjustments are made to the manufacturing process which enables continuous improvements 19 in the manufacturing process to be made. Outputs from the computer system 12 are also used to provide feedback 14 to the suppliers about how their supplies affect the factory results 16.

Determination of Attractor Structure

Figure 2:
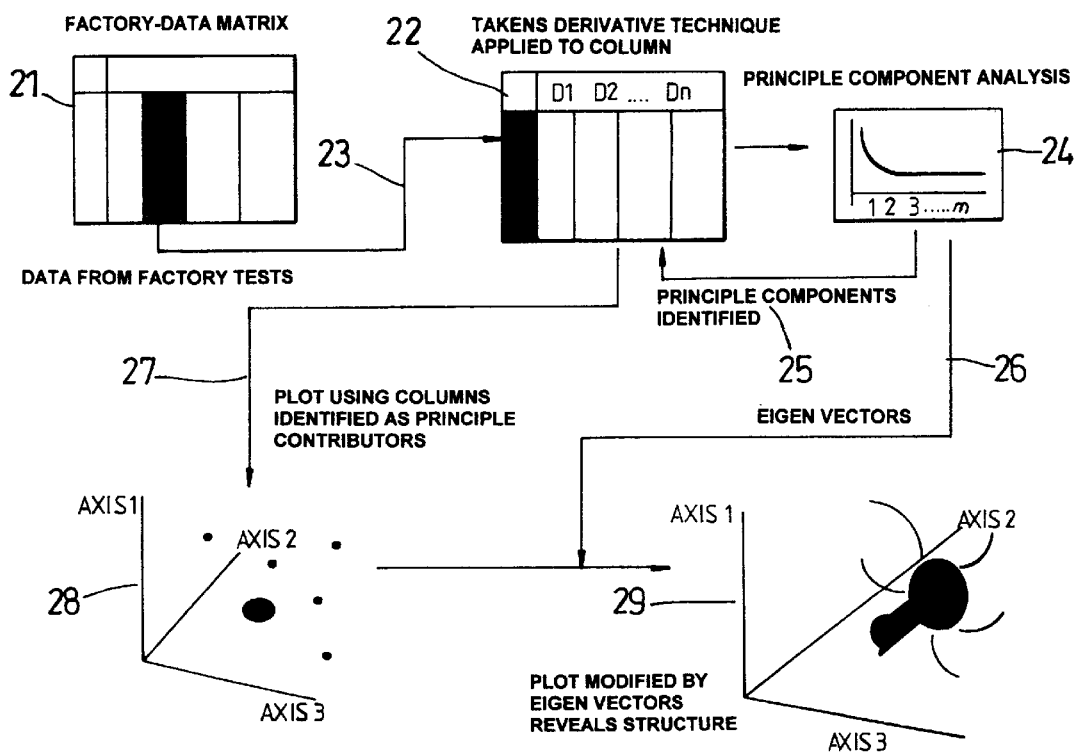
FIG. 2 is schematic flow diagram for a process to determine an attractor structure from a series of product data.

FIG. 2 shows an example of a method to determine from factory data the structure of an attractor. The factory data 21 comprises one or more series of product data. For example, if the products produced in the factory are electric circuits a series may comprise the gain of each circuit produced. The series comprises sequential data but the data does not need to be continuous or to have regular intervals between items in the series. For example, if gains are measured for each circuit produced during a day and then the factory closes for a day, data obtained the next day can still form part of the series already obtained. If another measurement is taken for each electric circuit, for example the impedance, then this could form a second series of product data.

Figure 6:
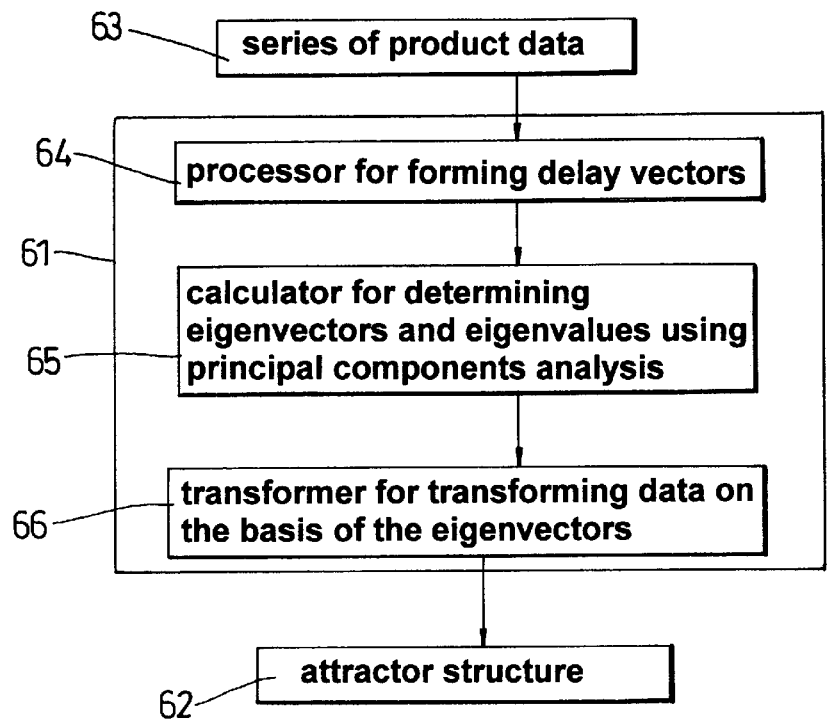
FIG. 6 is a flow diagram for an example of a method to determine an attractor structure from a series of product data.

The factory data 21 is provided in a matrix format as shown in box 21 of FIG. 2 although any other suitable format can be used. Data for a single series are stored in a column of the matrix 21 and then provided as input to a processor which applies a method as illustrated in FIG. 6.

The series of data selected from the factory data matrix 21 is represented in the first column of a matrix 22. From this data, a set of delay vectors are calculated using a particular value of a time delay. The delay vectors are stored in further columns of the matrix 22, such that each column represents the series after said particular time delay has been applied. The method for determining the time delay is described below.

Data from the matrix 22 is then analysed using a method entitled the "method of principal component analysis" as shown in box 24 of FIG. 2. The "method of principal component analysis" is described in detail below.

This provides three matrices, a metric of eigenvectors, a diagonal matrix of eigenvalues and an inverse matrix of eigenvectors. The first three columns of the data from the matrix 22 is taken and plotted to show the 3D structure of the time series as illustrated at 28 in FIG. 2.

The 3D structure is then further revealed by transforming the first three columns of data from matrix 22 using the eigenvectors and then plotting the transformed data, as shown at 29 in FIG. 2.

FIG. 6 shows a computer system 61 for substantially determining an attractor structure 62 from a series of product data 63 comprising:

(i) a processor 64 arranged to form a set of vectors wherein each vector comprises a number of successive values of the series of product data;

(ii) a calculator 65 arranged to calculate a set of eigenvectors and a set of eigenvalues from said set of vectors using the method of principal components analysis; and (iii) a transformer 66 arranged to transform the said set of vectors on the basis of said set of eigenvectors.

As explained above an ideal manufacturing system is one for which the process is described by a simple function. By describing the attractor structure of a series of product data, the user is able to monitor this structure and adjust the manufacturing process until the attractor structure becomes simpler. In this way the manufacturing process can be improved.

The attractor structure can also be used for warranty returns prediction. That is, some product produced by a manufacturer are returned to the manufacturer because they break down or show other faults whilst the product is still covered by a guarantee provided by that manufacturer. Manufacturers obviously aim to reduce the number of warranty returns as far as possible but it is difficult to predict whether a product that passes all the manufacturers tests after it is produced will fail at some future point in time. By analysing data about returned products using the attractor structure it is sometimes observed that data from the returned products is clustered in particular regions of the attractor structure. If this is the case, the manufacturer is alerted to the fact that future products produced which also relate to that region of the attractor will also be likely to fail in the future.

Predicting Future Value of Product Data

Figure 4:
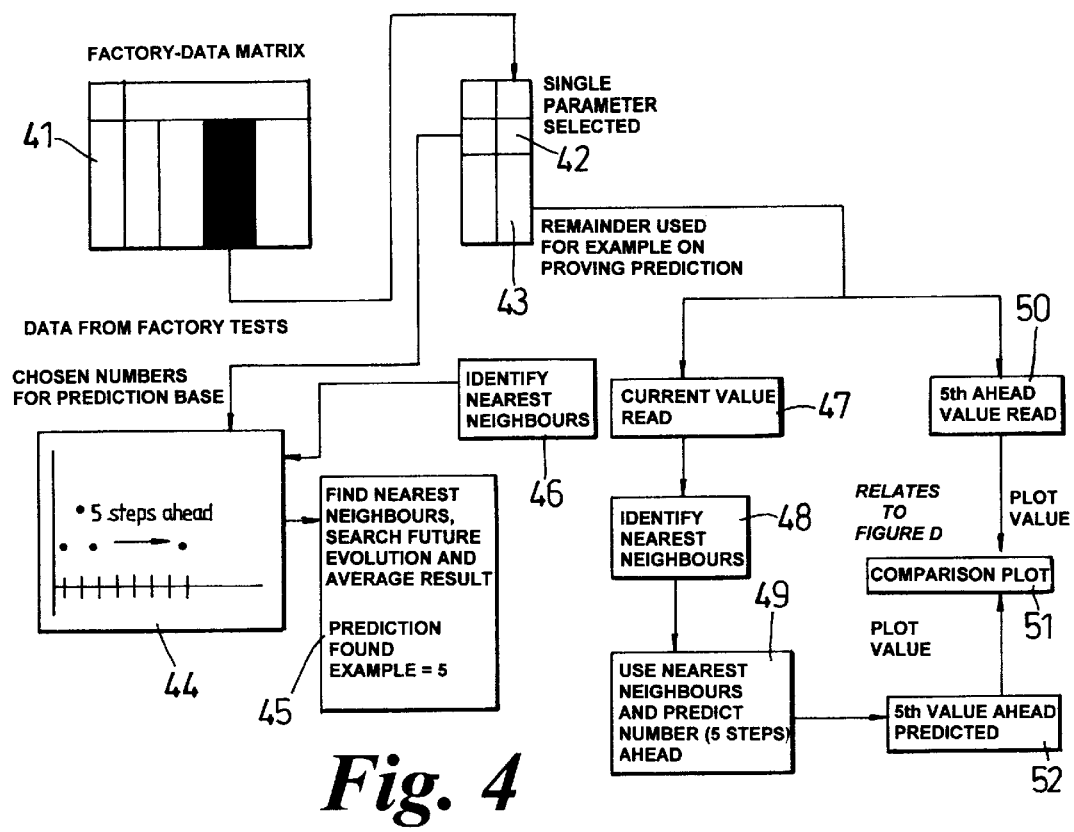
FIG. 4 is schematic flow diagram for a process to predict a future value of a series of product data.

FIG. 4 is an example of a method for predicting future values of a series of factory data. Factory data is provided in the format of a matrix 41 although any other suitable format can be used. Each row in the matrix represents one product produced in a manufacturing process and each column represents a series of factory data. For example, one column can be a series comprising the gain of each of a number of electric circuits produced by a factory. One of the series is taken and data from a first part 42 of this series is used for a learning phase during which a computer system "learns" or analyses the series in order to forecast future values of the series. A remainder part of the series 43 is then used to test the accuracy of the prediction.

Figure 7:
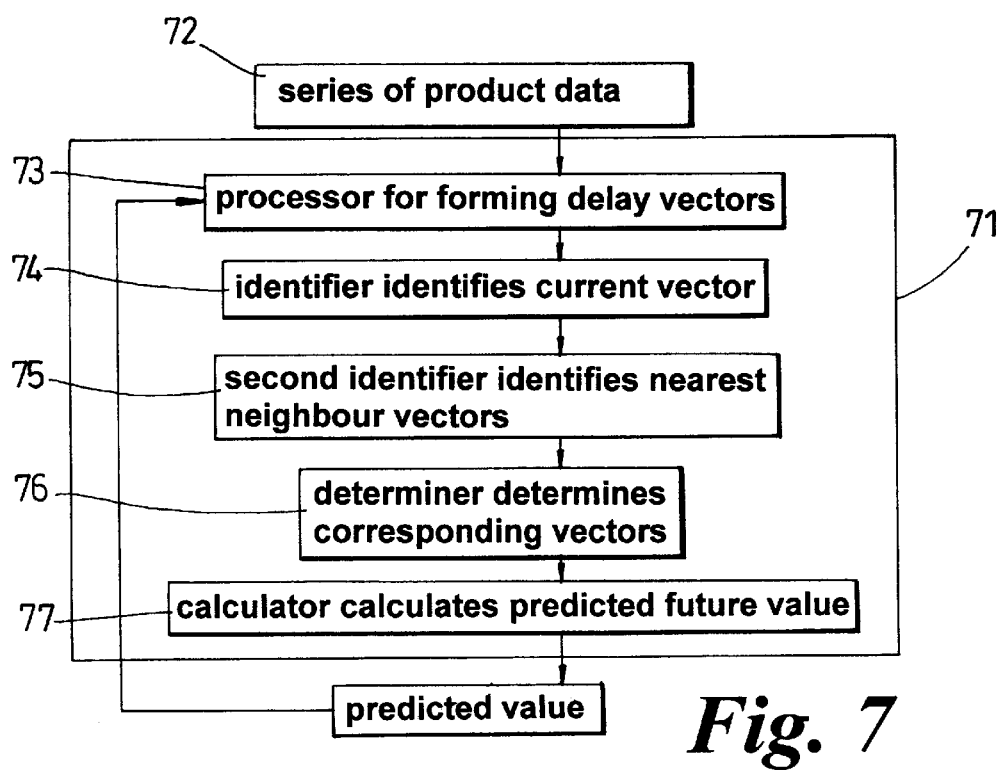
FIG. 7 is a flow diagram for an example of a method to predict a future value of a series of product data.

During the learning phase, data from the first part 42 of the series are analysed using a method as illustrated in FIG. 7. A matrix is formed as illustrated in box 22 of FIG. 2 where each column represents a successive time delay applied to the first part 42 of the series of product data. The time delay is determined as described in detail below. For a current vector, one or more nearest neighbour vectors are determined as shown at box 46. The current vector comprises a most recent value of the first part 42 of the series of product data so that the current vector represents the most recent information about products produced from a manufacturing process. For each nearest neighbour vector, a measure of similarity between that nearest neighbour vector and the current vector is less then a threshold value. The measure of similarity is distance for example. The next stage involves determining a corresponding vector for each nearest neighbour vector. Each corresponding vector comprises values of the series of product data that are a specified number of data values ahead of the data values of the nearest neighbour vector in said series of product data. These corresponding vectors are then used to calculate the predicted future value of the series of product data. For example this can be done by calculating an average of the corresponding vectors. Alternatively, a weighted average of the corresponding vectors can be calculated. For example, the weighting can be arranged so that vectors which relate to earlier times in the series of product data produce less influence on the result that vectors which relate to more recent times in the series of product data. The actual value of the series of product data is obtained, from the remaining part of the series 43, which corresponds to the predicted value, the actual and predicted values are compared. Outputs are then provided to a user on the basis of the actual and predicted values as shown in FIG. 8.

FIG. 7 shows a computer system 71 for predicting a future value of a series of product data 72 comprising:

(i) a processor 73 arranged to form a set of vectors wherein each vector comprises a number of successive values of the series of product data;

(ii) an identifier 74 arranged to identify from said set of vectors, a current vector which comprises a most recent value of the series of product data;

(iii) a second identifier 75 arranged to identify at least one nearest neighbour vector from said set of vectors, wherein for each nearest neighbour vector a measure of similarity between that nearest neighbour vector and the current vector is less than a threshold value;

(iv) a determiner 76 arranged to determine, for each nearest neighbour vector, a corresponding vector, each corresponding vector comprising values of the series of product data that are a specified number of data values ahead of the data values of the nearest neighbour vector in said series of product data; and (v) a calculator 77 arranged to calculate the predicted future value on the basis of at least some of the corresponding vector(s).

Figure 8A:
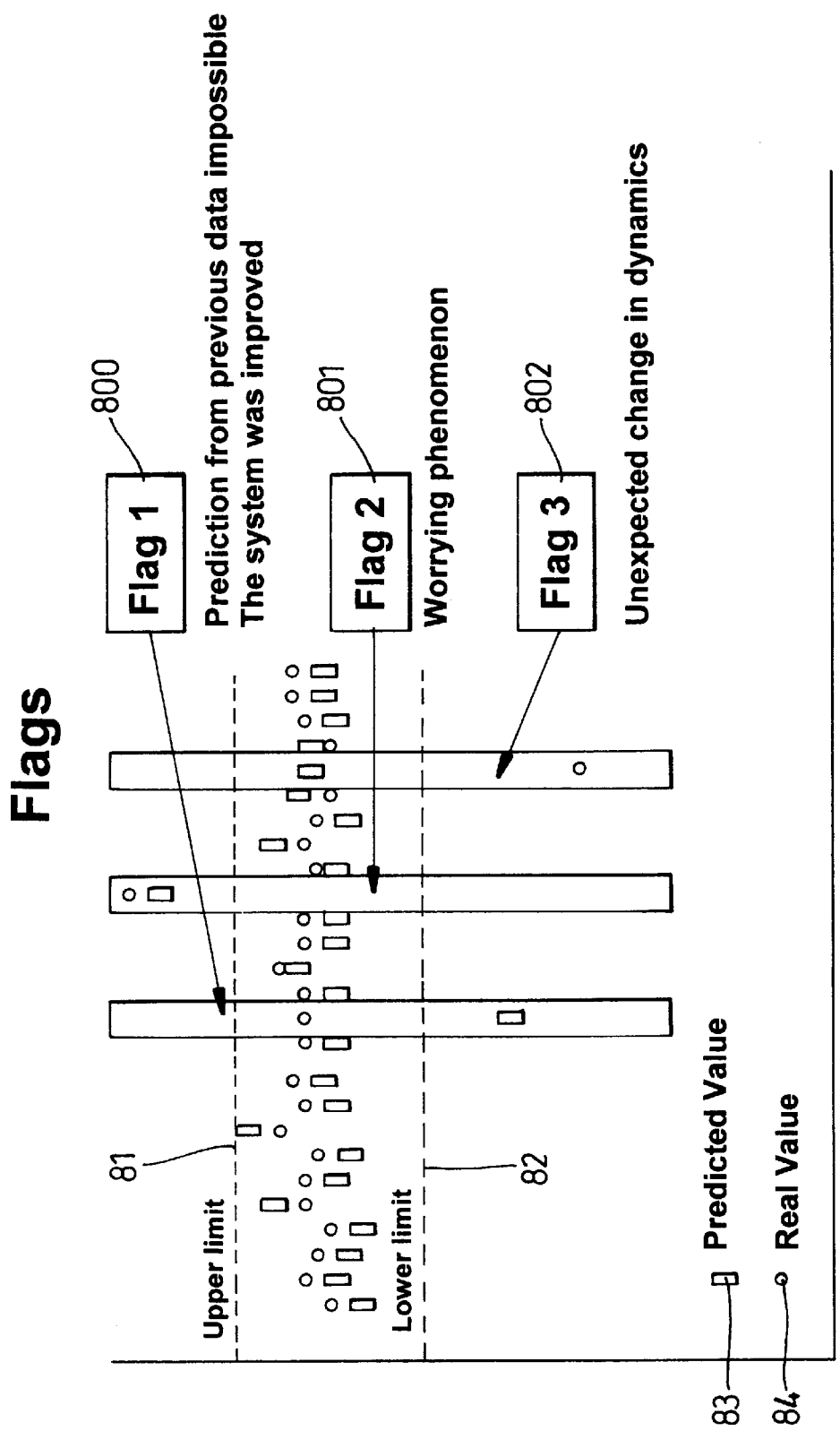
FIG. 8a is a graph of product data value against measurement number which shows predicted and actual values.

FIG. 8*a* shows a graph of product data values against measurement number. An upper limit 81 and a lower limit 82 are shown and these represent tolerance limits set by the factory controllers; products should fall within these limits otherwise they will be rejected. Predicted values 83 and real or actual values 84 are shown where the predicted values are obtained using a computer system according to the present invention. If the real value is within the tolerance limits but the predicted value is below the lower limit, then flag 1 (800) is presented to the user. In this case the prediction indicated that the manufacturing process was going to produce a product that did not meet the tolerance limits, but the manufacturing process improved. If the real and the predicted value are both above the upper limit 81 then flag 2 (801) is presented to the user. In this case the user is alerted to a worrying phenomenon in the manufacturing process. If the real value is below the lower limit 82 and the predicted value is within the limits then flag 3 (802) is presented to the user. In this case an unexpected change in the dynamics of the manufacturing process has been observed. FIG. 8*a* shows only one example of a system of flags that can be used to provide the user with information about the manufacturing process. Other methods can also be used to provide this information to the user.

FIG. 8*b* is an example of a truth-table for interpretation of the results of the prediction process. The table contains columns which relate to whether the prediction was met 85 or not met 86; whether the condition of the manufacturing process was good 87 or bad 88 (e.g. whether the product data was within the tolerance limits or not); and whether the actual product data had changed by a large 89 or a small 90 amount compared with the previous data value. For all the different combinations of these conditions, an interpretation is given in the column marked 91 and an opportunity flag is given in column 92.

The prediction results can also be combined with other information about the manufacturing process. For example, information about changes in suppliers and batches and about changes in temperature or humidity in the factory are recorded and taken into account with the prediction results. In this way the manufacturing process as a whole is better understood because the effects of changes in the factory, product design, suppliers, and other factors that affect the product are monitored and analysed.

A method for predicting future values of a series of factory data is now described in detail. In this example, a time delay $\tau$ is referred to as "v". The series of product data are scalar measurements:

$$s_n = s(X_n), n=1, \ldots, N,$$

A delay reconstruction is used to obtain vectors equivalent to the original ones (these vectors are referred to as delay vectors):

$$S_n = (s_{n-(m-1)v}, s_{n-(m-2)v}, \ldots, s_{n-v}, s_n).$$

This procedure introduces two adjustable parameters into the prediction method (which is in principle parameter free): a delay time v and an embedding dimension m. Choose a delay time v and an embedding dimension m. For all measurements $s_1, \ldots, s_N$ available so far, construct the corresponding delay vectors $s_{(m-1)v+1}, \ldots, s_N$. In order to predict a future measurement $s_{N+\Delta n}$, choose the value of a parameter e of the order of the resolution of the measurements and form a neighbourhood $U_e(s_N)$ of radius e around the point $s_N$. For all points $s_n \in U_e(s_N)$, that is, all points closer than e to $s_N$ (i.e. the nearest neighbours), look up the individual "predictions" $s_{n+\Delta n}$. The finally accepted prediction is then calculated as the average of all these individual predictions:

$$s_{n+\Delta n} = 1/|\bigcup e(s_N)| \sum s_{N+\Delta n}.$$

Here $|Ue(s_N)|$ denotes the number of elements of the neighbourhood $Ue(sN)$. If no nearest neighbours closer than e are found then the value of e is increased until some nearest neighbours are found.

The quality of the prediction depends on the data and also on the position of the last data value in the m-dimensional space. FIG. 9 shows parts of the structure of a known attractor, the Lorenz attractor. Graph 901 shows a region on the attractor which affords a good prediction. The current observation of the series is represented as point 911 and the nearest neighbours to this point are those points within the region labelled 902. The predicted value of the series is shown as 912 and the nearest neighbours to this point are within region 903. Graph 904 shows a region from graph 901 in greater detail. Because the actual observation 911 and the predicted value 912 are positioned along a similar trajectory within the attractor the prediction is likely to be successful. However, graph 905 shows a region in the Lorenz attractor where trajectories cross and change direction. In this region prediction is difficult. The actual observation 916 and the predicted value 915 do not lie along the same trajectory.

Figure 10:
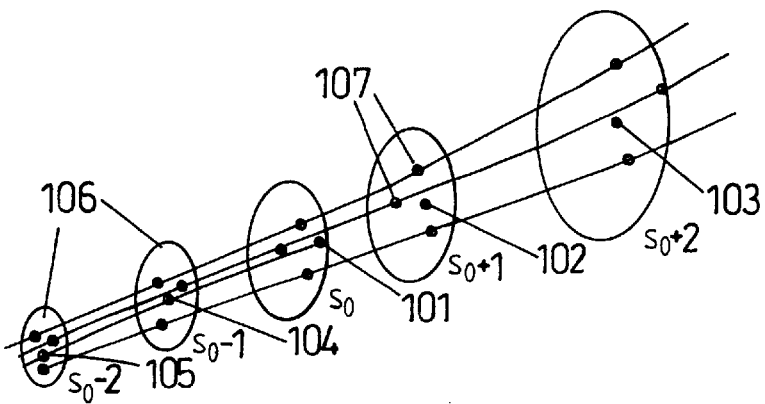
FIG. 10 is a schematic diagram of a series of product data.

In order to improve the prediction for situations where trajectories within the attractor are changing direction the following step is incorporated into the prediction method. FIG. 10 is a schematic diagram of a number of measurements in a series of product data. The rings 106 represent neighbourhoods around measurements in the series. Point 101 represents the current observation in the series. Point 104 represents the previous observation in the series and point 105 represents the observation in the series prior to the previous observation. Similarly, points 102 and 103 represent the predicted values for the next and next but one values in the series respectively. Within each ring 106 a number of nearest neighbours are represented 107. Given the current observation the prediction method can be used to predict a future value 102 as described above. In order to make this prediction the nearest neighbours for the current observation 101 are "projected forward" one measurement step and this assumes that the trajectory directions for those nearest neighbours has not changed direction substantially. In order to check whether the trajectory direction(s) have changed substantially the previous two measurement steps are checked. The nearest neighbours of the current observation 101 are traced backwards for a measurement step and this gives a set of "second corresponding vectors". If these second corresponding vectors lie within the nearest neighbourhood 106 for measurement 104 (in this example, measurement 104 is the "particular vector" of Claim 14) then this is an indication that the trajectory has not changed direction substantially. For second corresponding vectors that do not lie within the nearest neighbourhood 106 for measurement 104, their corresponding nearest neighbours from step 101 are not used when determining the predicted value 102 or 103. Similarly, the nearest neighbours of the current observation 101 can be traced backwards for two measurement steps or a greater number of measurements steps.

The prediction results output from the computer are also provided with confidence limits which given an indication of how accurate the prediction is. The confidence limits are determined using information about the input data and also the prediction method as is know to a skilled person in the art.

It is also possible to improve the prediction results by "cleaning up" the input data before it is provided to the prediction process. For example, extreme outlying values are removed from the data in cases where an impedance level is measured as 0 and in similar situations.

Matlab Toolbox

Figure 12:
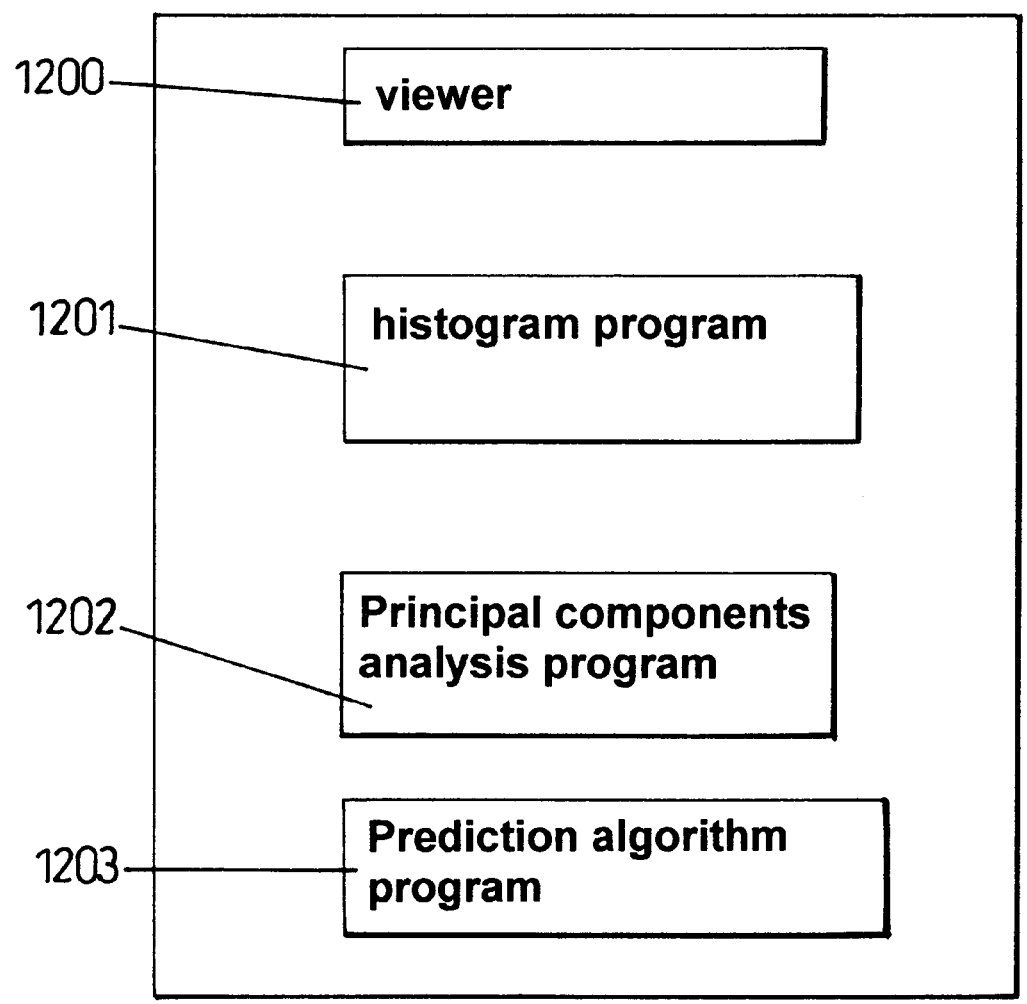
FIG. 12 shows an example of a suite of software programs that form part of the computer system.

The computer system also comprises a suite of software programs as shown in FIG. 12 written using the Matlab system. However any other suitable programming language can be used to form these programs. The programs include a viewer 1200, a histogram program 1201, a principal components analysis program 1202 and a prediction algorithm program 1203.

Viewer

Figure 13:
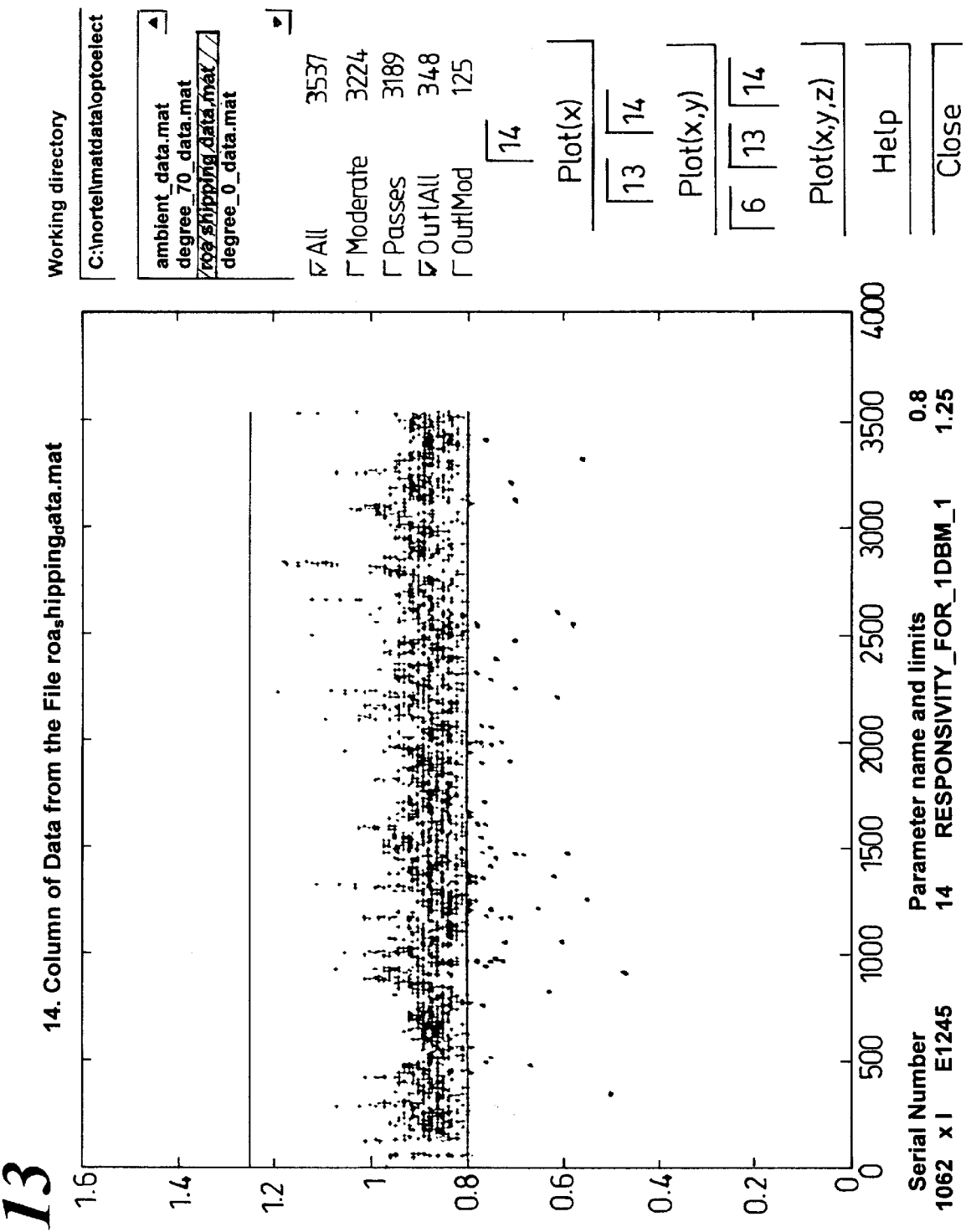
FIG. 13 is an example of a display from the view program.

The viewer program allows the user to open directories, view matlab database files, open files and select matrices for displaying. One, two and three dimensional plots can be drawn and it is possible to "zoom in" on areas of these plots and to rotate the three dimensional plots. The name of the parameter being displayed is shown on a display screen together with the upper and lower tolerance limits, set by the factory for that particular parameter. A help facility is provided for the user which presents basic information about the program and a close button allows the program to be exited. FIG. 13 is an example of a user interface display produced by this program. In this example, parameter 14 from the data file "roa shipping data" is presented. These values are shown on the y axis and the x axis represents the position in the data sequence. The horizontal lines on the graph show the tolerance limits set by the factory for this parameter. In this example, all data points available for this series are plotted. This includes data for products that have given test readings that "failed" on another parameter; most of these points fall below the lower tolerance limit. Also included are data points from products which gave test readings which were associated with some sort of physical defect or assembly malfunction e.g. 0 impedance—short circuit. These data points are extrinsic to the process that it is aimed to model. The majority of the data points represent products for which the parameter value "passed".

Histogram Program

Figure 14:
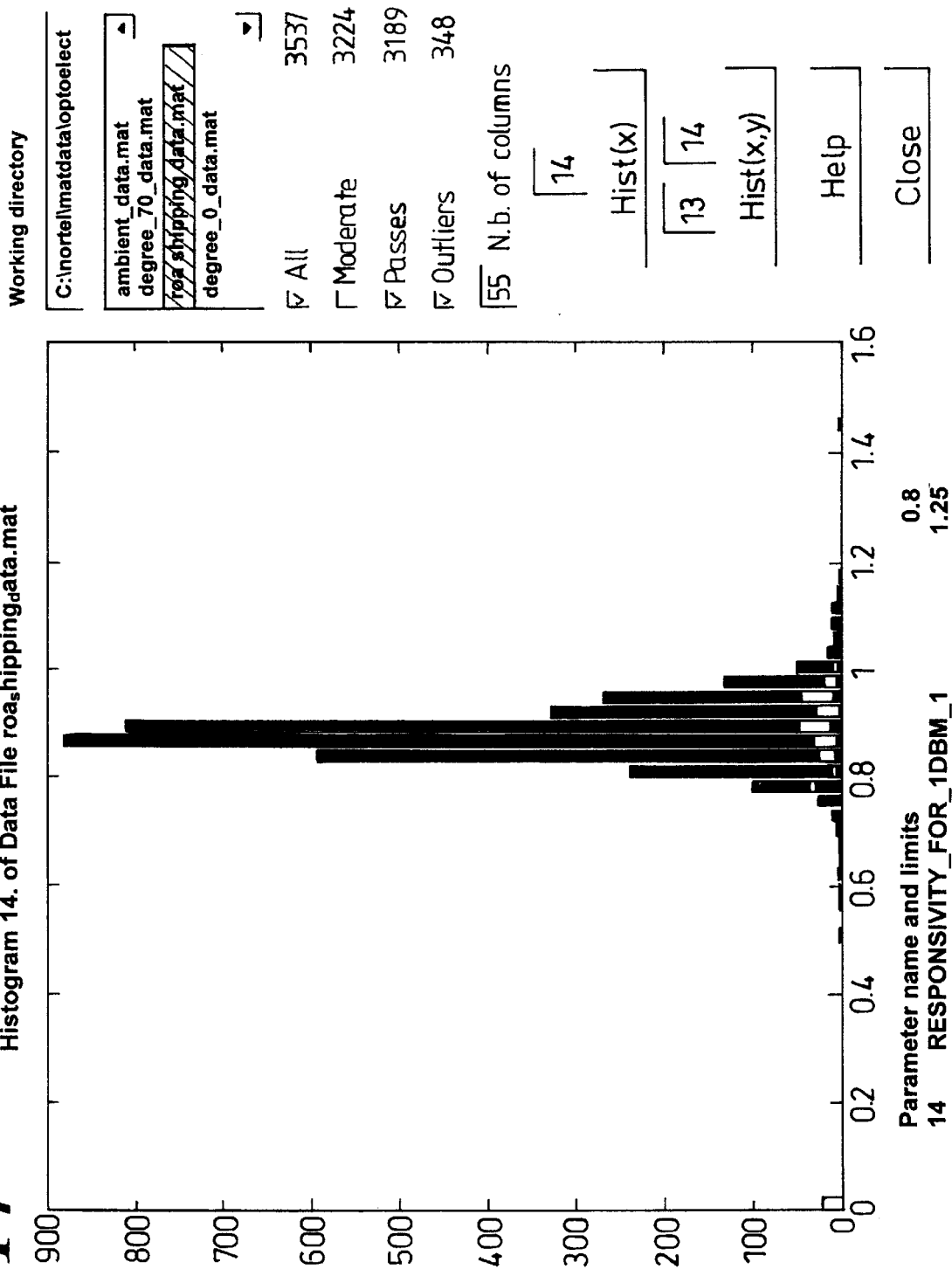
FIG. 14 is an example of a display from the histogram program.

The functions that the histogram program provides are:
opening directories
viewing matlab database files
opening files
selecting matrices for displaying
plotting one or two dimensional histograms
the ability to select the optimal number of histogram columns
the ability to "zoom" into a region of a histogram, or to rotate a 2 dimensional histogram
display of tolerance limits, title
provision of help facility and close facility FIG. 14 shows an example of a display from the histogram program. This is for the same data set as shown in FIG. 13.

Principal Components Analysis Program

Figure 15:
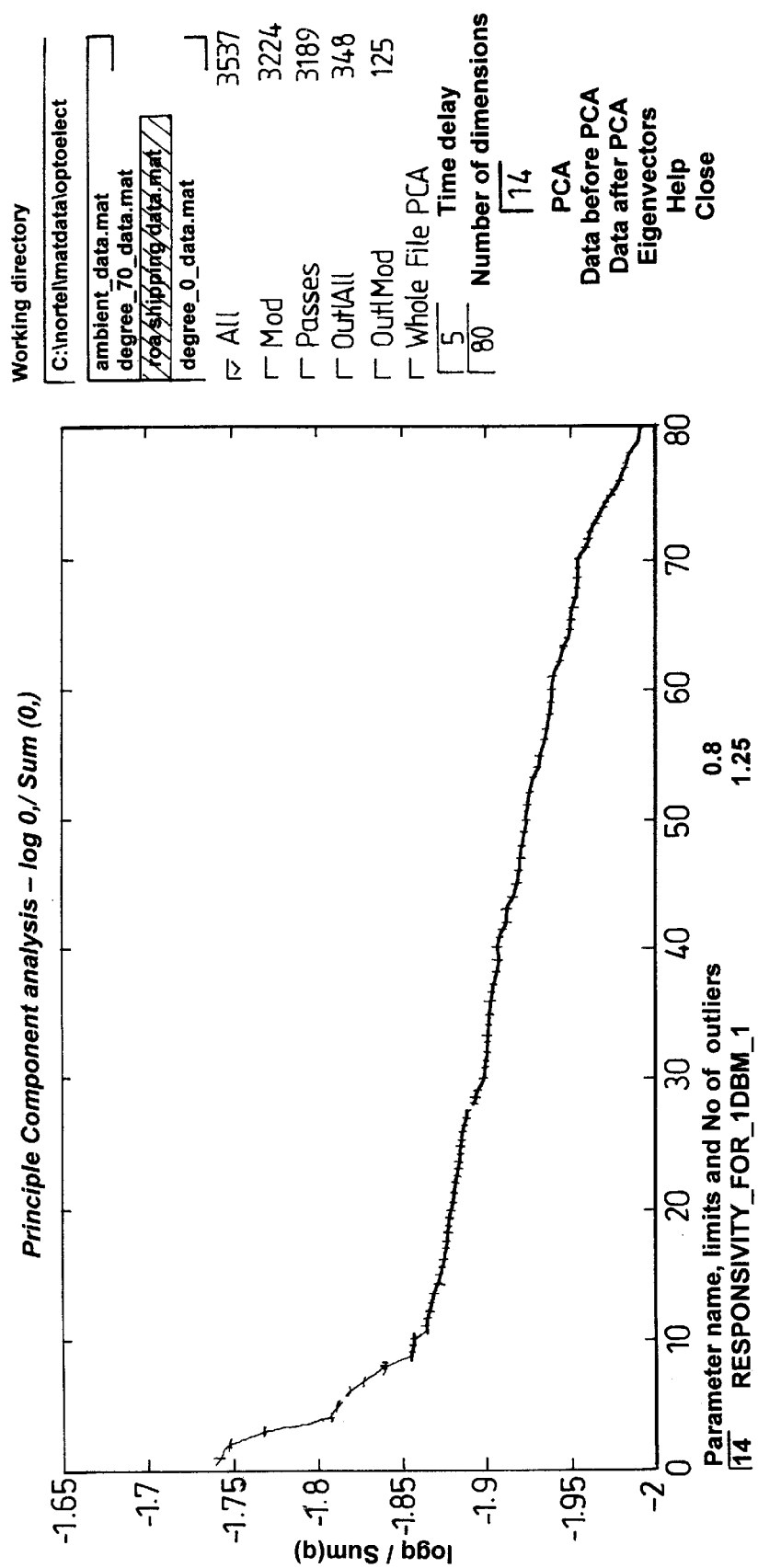
FIG. 15 is an example of a display from the principal components analysis program.

The functions that the principal components analysis program provides include:
opening directories
viewing matlab database files
opening files
selecting matrices for displaying
carrying out a principal components analysis as described herein, for data in a single file, or a selection of data from a single file
carrying out a principal components analysis as described herein, for a single parameter
provision of a zooming 1 dimensional plot of the eigenvalues
provision of 3 dimensional plots of the data before or after transformation using the eigenvectors and ability to rotate these plots
display of parameter name, tolerance limits, title
help facility and close facility FIG. 15 shows the results of a principal component analysis for the data set of FIGS. 13 and 14. In this example, the time delay was 5. The x axis shows the displacement number and the y axis shows an indication of the contribution that each delay vector makes to the results. In this example, the first 8 or so delay vectors are shown to have a relatively large effect on the results. FIG. 16a shows an example of the first three columns of the matrix 22 plotted for the same data set as for FIGS. 13, 14 and 15. In this example, the time delay was 5. FIG. 16b shows a similar plot but for the data of FIG. 16 a after it has been transformed during the principal component analysis using the eigenvectors. This unexpectedly reveals an attractor structure given that the data set (shown in FIG. 13) is irregular and contains outlying values and discontinuities.

Figure 17:
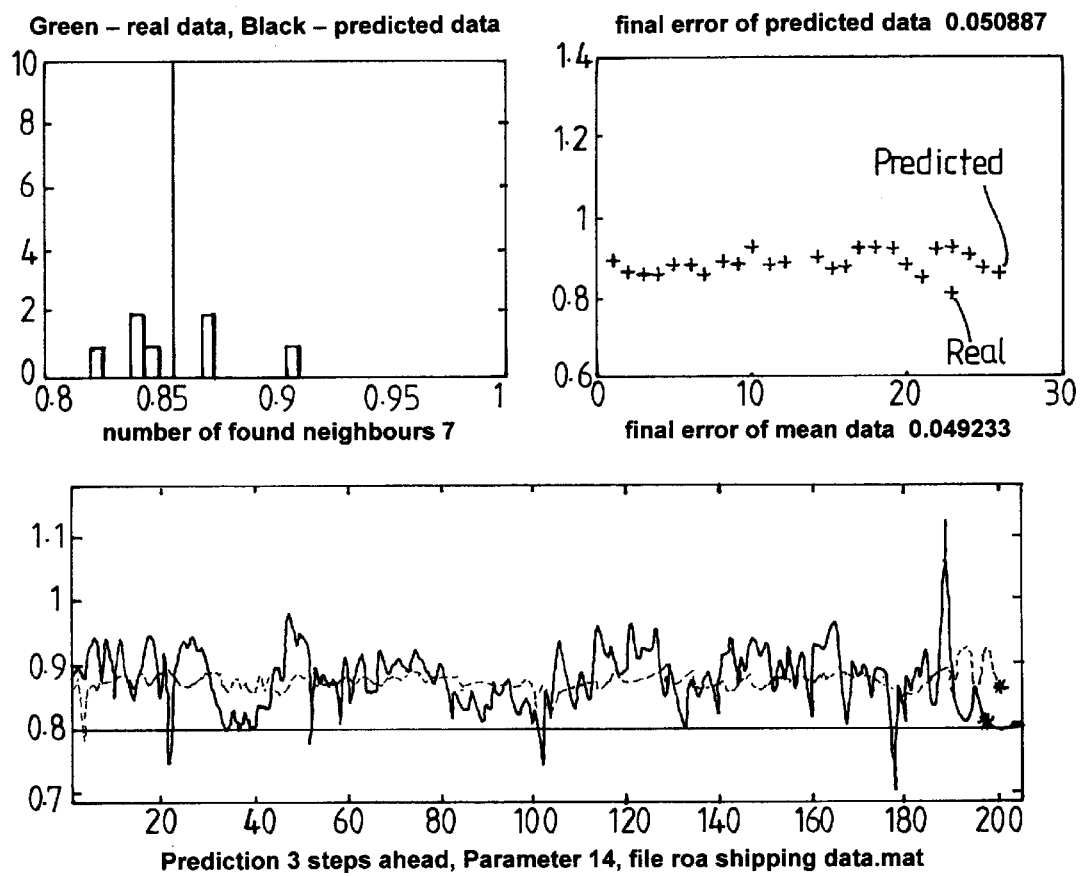
FIG. 17 is an example of a display from the prediction algorithm program.

FIG. 17 shows an example of displays from the prediction program which implements the prediction method described herein. The data set is the same as for FIGS. 13 to 16. The lower graph in FIG. 17 shows a graph of predicted (dotted) and real (solid) data with the horizontal line indicating the lower tolerance limit for this parameter (set by the factory). The upper tolerance limit was set at 1.2 and is not shown. The current real and predicted values are shown by stars at the end of the respective lines. (The star at the end of the dotted line is predicted from the star at the end of the solid line.) In this case the prediction length was three steps ahead.

The upper right hand plot in FIG. 17 shows a graph of the predicted (indicated by "+" symbols) and real (indicated by dot symbols) values for the last 25 predictions. The two stars show the current predicted and real values.

The upper left hand plot in FIG. 17 shows a histogram of the data used to predict the predicted value. In this example 7 nearest neighbours were found and the "predicted values" for these neighbours (found by following their trajectory three time steps ahead) are shown in the histogram. The vertical line depicts the predicted (averaged) value of the "predicted" neighbours and in this example the vertical line also depicts the real value which corresponds to the predicted value. The real value is obtained by waiting until this value is received from the factory test devices.

In the example shown in FIG. 17 the prediction is made for a time delay of 5 and an embedding dimension of 7. The prediction base is 2000 tests and the program predicts 3 steps ahead for the next 200 tests.

FIG. 18 is similar to FIG. 17 and shows data from the same file and for the same parameter. However, this time more prediction tests are shown and the prediction step size is 1. The lower plot in FIG. 18 shows the prediction error against the number of steps predicted ahead. This shows how the prediction error (line 180) increases as the number of steps predicted ahead increases and indicates that for 15 prediction steps ahead, the prediction error is only around 0.06. Line 180 shows the root mean square error of the predictions produced by the prediction algorithm described herein. Line 181 shows the root mean square error when the prediction is that the next value in the series will be the mean of the values so far. This line is shown for comparison purposes only.

Figure 19:
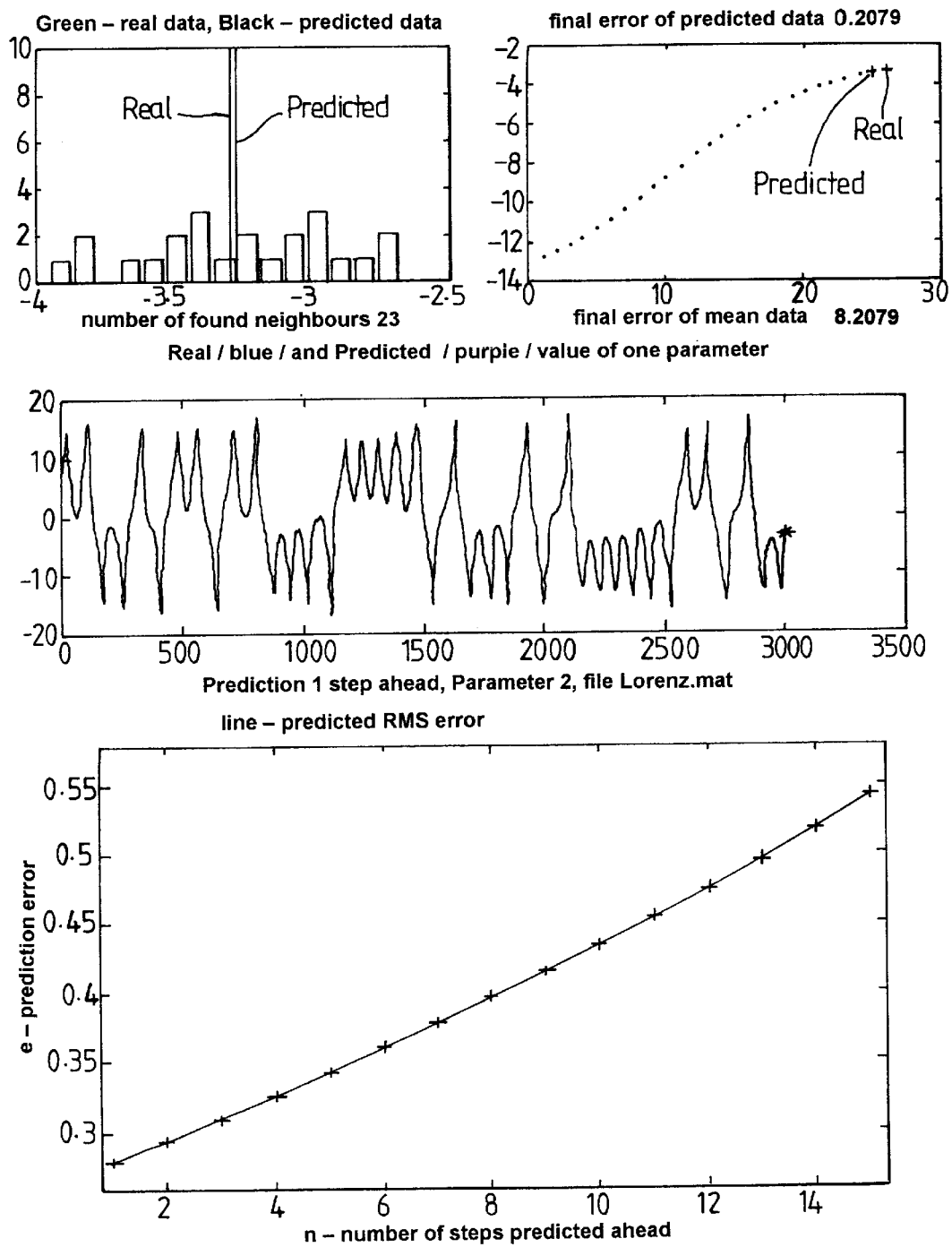
FIG. 19 is an example of a display from the prediction algorithm program for data describing the known Lorenz attractor.

The prediction algorithm and the method for determining the attractor structure have been extensively tested using known data to check for errors and artefacts in the methods. No such artefacts have been found. For example, FIG. 19 corresponds to FIGS. 17 and 18 but in this case, data from the known Lorenz attractor were input to the computer system. FIG. 19 shows how the predicted values from the prediction algorithm and the actual data correspond almost exactly.

Choosing the Time Delay

The value of the time delay that is used affects the results of the prediction process and the structure of the attractor that is determined from the product data. This means that the method used for determining the time delay is very important. The value of the time delay is chosen such that it fits the following conditions:

The time delay $\tau$ (which has also been referred to using the symbol "v" above) must be a multiple of the sampling period because data is only available at these times. (In the situation that the time interval between the product data measurements is irregular, the time delay is a certain number of steps in the series, regardless of the time intervals between the product data measurements.)

If the time delay is too small, then the co-ordinates $x_i$ and $x_{i+\tau}$ will be so close to each other in numerical value that we cannot distinguish them from each other. They will not be independent enough because they are not two independent co-ordinates.

If the time delay is too large the $x_i$ and $x_{i+\tau}$ are completely independent of each other in a statistical sense, and the projection of an orbit on the attractor is onto these two totally unrelated directions. The independence of co-ordinates is caused by an intrinsic instability of chaotic systems which is growing with time.

The following three methods are used in order to determine the time delay:
1. optimal filling of the state space;
2. autocorrelation function; and
3. average mutual information.

A sensible compromise value for the time delay is chosen based on the results of one or more of these three methods. These methods are now described in detail:

Optimal Filling of the State Space

Figure 3A:
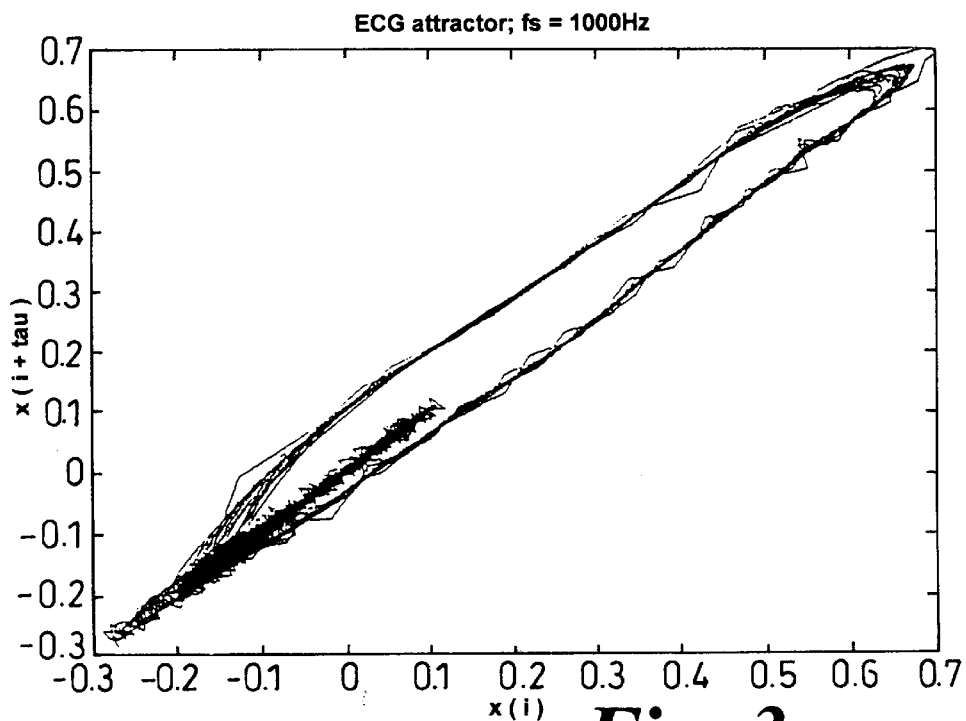
FIG. 3a shows reconstruction of an electrocardiogram (ECG) attractor in 2 dimensional space where the time delay is 2 ms and the sampling interval is 1 ms.
Figure 3B:
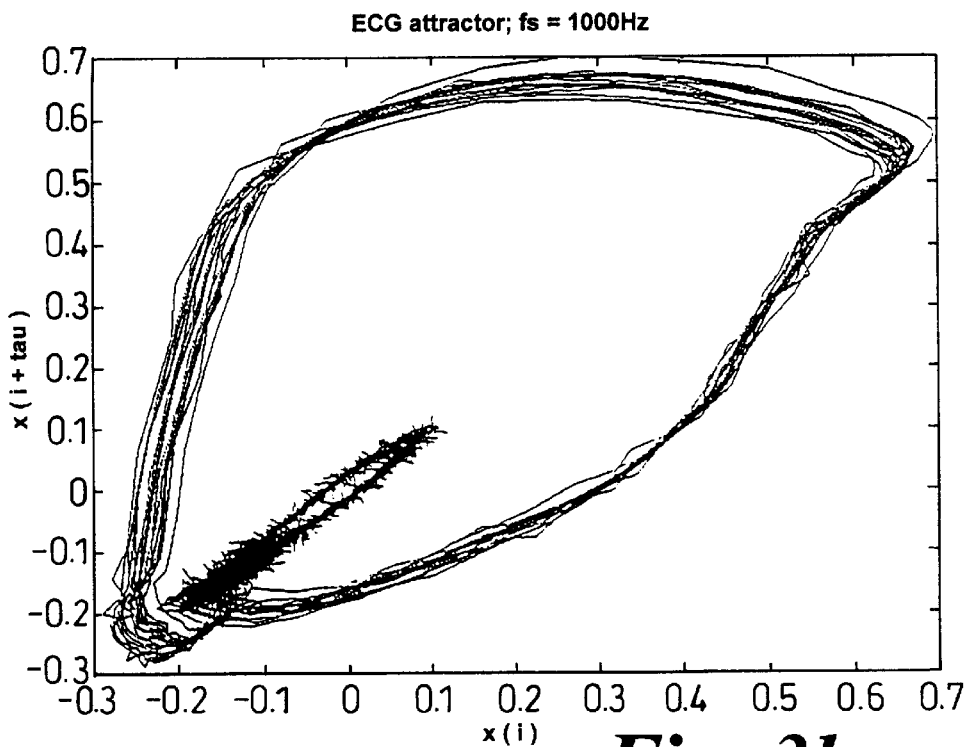
FIG. 3b shows reconstruction of an electrocardiogram (ECG) attractor in 2 dimensional space where the time delay is 8 and the sampling interval is 1 ms.
Figure 3C:
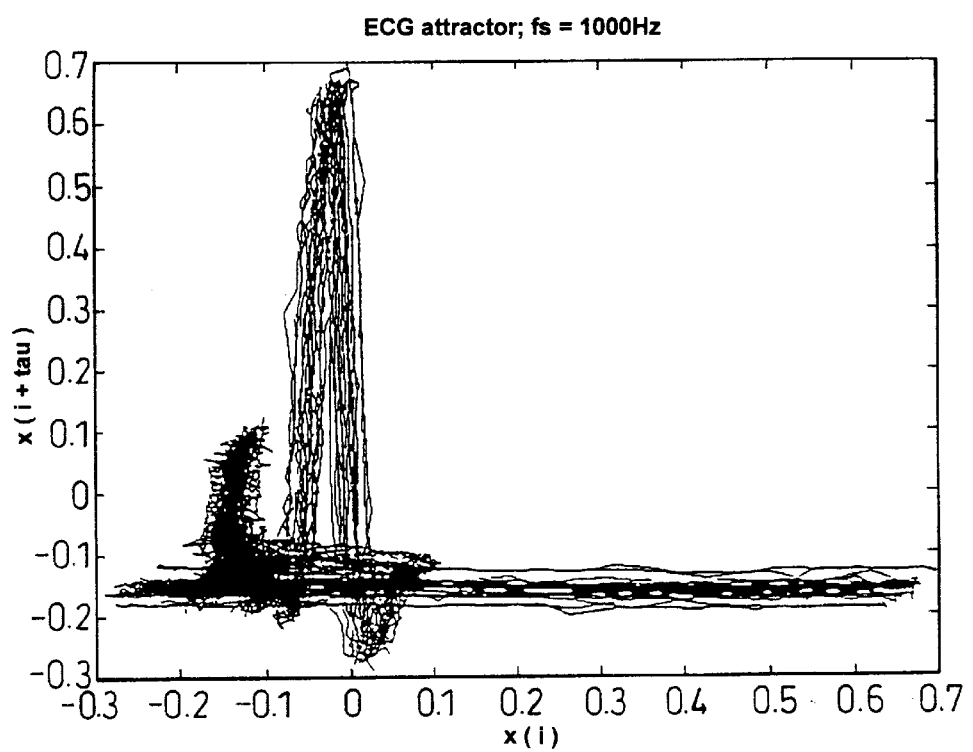
FIG. 3c shows reconstruction of an electrocardiogram (ECG) attractor in 2 dimensional space where the time delay is 220 and the sampling interval is 1 ms.

In this method, phase portraits are plotted for different values of the time delay and the situation in which the phase portrait best fills the state space is chosen. For example, FIGS. 3a, 3b and 3c show phase portraits for an ECG (electrocardiogram) signal. In FIG. 3a the time delay is 2; in FIG. 3b the time delay is 8 and in FIG. 3c the time delay is 220. When the time delay is 2 (FIG. 3a) the phase portrait is too contracted around the diagonal. When the time delay is 220 then geometrical deformation of the phase portrait occurs (FIG. 3c). The time delay is therefore chosen to be 8 because in FIG. 3b the phase portrait fills the state space relatively well, compared to FIGS. 3a and 3c.

Autocorrelation Function

Figure 20:
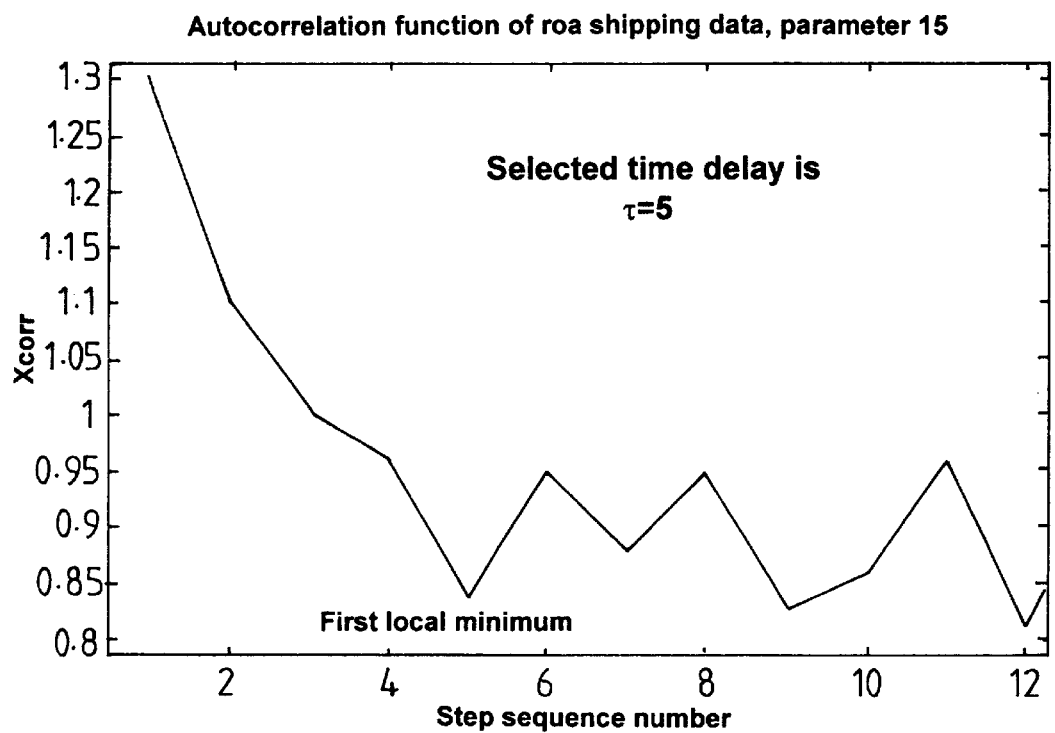
FIG. 20 shows a graph of autocorrelation function against step sequence number (or time delay) for the data set "roa shipping data, parameter 15".

This method involves plotting a graph of autocorrelation against step sequence number (or time delay). FIG. 20 shows an example of this type of graph for the data series "roa shipping data, parameter 15". In this example, the first local minimum of this graph occurs at around step sequence number 5 (or time delay =5).

It is not essential to choose the first local minimum of this graph. Other local minima points can also be chosen.

An example of an autocorrelation function $C_L(\tau)$ that is used to plot the autocorrelation graph is given below:

$$C_L(\tau) = \frac{\frac{1}{N}\sum_{m=1}^{N}[s(m+\tau)-\bar{s}]\cdot[s(m)-\bar{s}]}{\frac{1}{N}\sum_{m=1}^{N}[s(m)-\bar{s}]^2},$$

$$\bar{s} = \frac{1}{N}\sum_{m=1}^{N}s(m).$$

Average Mutual Information

The average mutual information is a method, which provides a notion of general independence between two time series measurements $a_i$ and $b_j$ drawn from sets A and B of all possible measurements. The "mutual information" between measurement $a_i$ drawn from a set $A=\{a_i\}$ and measurement bj drawn from a set $B=\{b_j\}$ is the amount learned by the measurement of $a_i$ about the measurement of $b_j$. In bits it is:

$$\log_2[(P_{AB}(a,b_j))/(P_A(a_i) \cdot P_B(b_j))],$$

where $P_{AB}(a,b)$ is the joint probability density for measurements A and B resulting in values a and b. $P_A(a)$ and $P_B(b)$ are the i ndividual probability densities for the measurements of A and of B.

If the measurement of a value from A resulting in $a_i$ is completely independent of the measurement of a value from B resulting in $b_j$, then $P_{AB}(a,b)$ factorises: $P_{AB}(a,b)=P_A(a) \cdot P_B(b)$ and the amount of information between the measurements, the mutual information, is zero. The average over all measurements is called the "average mutual information" between A measurements and B measurements and it is considered as:

$$I_{AB} = \sum P_{AB}(a_i, b_j)\log_2[(P_{AB}(a_i, b_j))/(P_A(a_i) \cdot P_B(b_j))]$$

This technique is strictly a set theoretic idea which connects two sets of measurements with each other and establishes a criterion for their mutual dependence based on the notion of information connection between them.

We want to find the connection between the set of data $x_i$, and the set of delay data $x_{i+\tau}$. So we take as the set of measurements A the values of $x_I$ and for the B measurements the values of $x_{i+\tau}$. Then the average mutual information is:

$$I(\tau) = \sum P(x_i, x_{i+\tau})\log_2[(P(x_i, x_{i+\tau}))/(P(x_i) \cdot P(x_{i+\tau}))]$$

In order to evaluate $I(\tau)$ from data the following method is used. In a deterministic system we evaluate the amount of information in each measurements by constructing a histogram of the variations of the $a_i$ and $b_j$ and by computing the entropy of the system:

$$H(A) = -\sum_{i=1}^{N} P(a_i) \cdot \log(P(a_i))$$

$$H(B) = -\sum_{j=1}^{M} P(b_j) \cdot \log(P(b_j))$$

We construct a 2-dimensional histogram for the joint probability density $P_{AB}$ and we then compute the joint entropy:

$$H(A \& B) = -\sum_{i=1}^{N}\sum_{j=1}^{M} P(a_i, b_j) \cdot \log(P(a_i, b_j))$$

The average mutual information is:

$$I=H(A)+H(B)-H(A\&B)$$

This means that the sum of joint information H(A&B) is lower than the sum H(A)+H(B). The difference is the average mutual information, i.e. the information we can learn from the set A about the set B.

Figure 5:
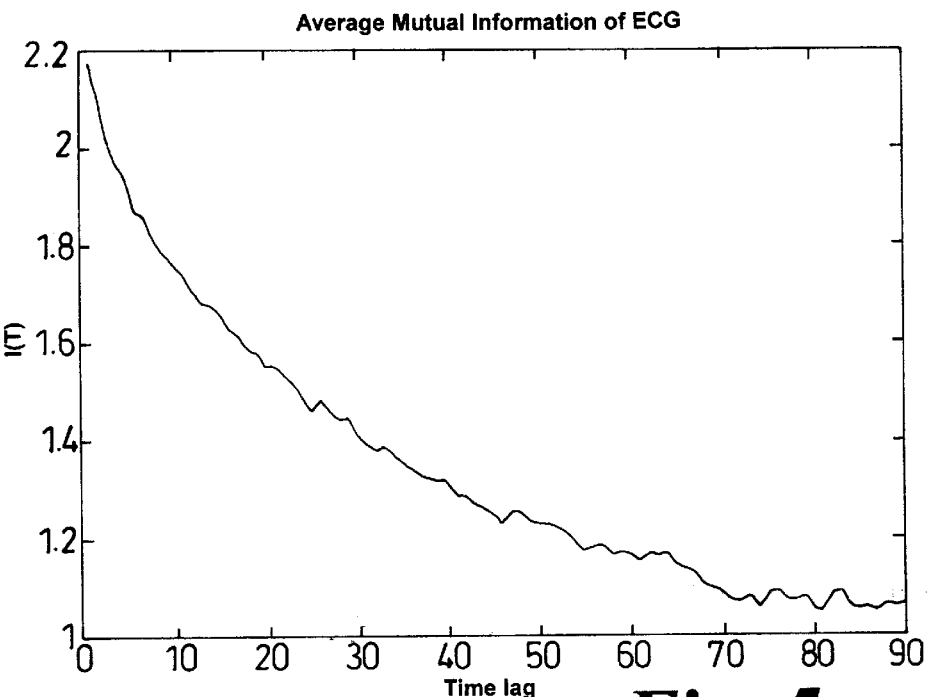
FIG. 5 shows a graph of average mutual information against time lag (or time delay) for electrocardiogram data.

A plot of the average mutual information $I(\tau)$ is made as shown in FIG. 5. The time delay is chosen as the first local minimum of $I(\tau)$. For example, in FIG. 5 the first local minimum occurs at about $\tau=20$. However, it is not essential to choose the fist local minimum, other local minima can be taken. Another option is to choose the value of $\tau$ where $I(\tau)=I(0)/5$.

Choosing the Embedding Dimension

The value of the embedding dimension that is used affects the results of the prediction process and the structure of the attractor that is determined from the product data. This means that it is important to determine the embedding dimension well. The embedding dimension is the lowest dimension which unfolds the attractor fully and eliminates overlapping trajectories. Since computational costs rise exponentially, we should used the minimum possible dimension. Also background noise could be misinterpreted as a low-dimensional process if the embedding dimension is too large.

The following four methods are used to determine the embedding dimension:
1. principal component analysis
2. saturation of systems invariants
3. false nearest neighbours
4. true vector fields The embedding dimension is chosen based on the results of one or all of these methods. These four methods are described below:

Principal Component Analysis

This method is also known as singular value analysis, Karhunen-Loeve decomposition and principal value decomposition. It is a general algorithm for decomposing multi-dimensional data into linearly independent co-ordinates. Mathematically the algorithm involves decomposing a rectangular m-by-n matrix, X, into the following form:

$$X=S\Sigma C^T$$

where T denotes transpose. S and C are column orthogonal matrices, the columns of which are called the "singular values", $\sigma_i$, of X, where $\sigma_1 \geq \sigma_2 \geq \sigma_3 \geq \sigma_4 \geq \ldots \geq \sigma_n$.

Consider the delay vector as $$\{X_i^m\}=\{(X_i,X_{i+\tau},X_{i+2\tau},\ldots,X_{i+(m-1)\tau})\}\in R^m$$

and the delay matrix $X$ $R^{n \times m}$ as a normalised sequence of all delay vectors, $$X = \frac{1}{\sqrt{N}}\begin{pmatrix} x_1''' \\ x_2''' \\ x_3''' \\ \vdots \\ x_N''' \end{pmatrix},$$

where N is the number of measured samples and m is the embedding dimension. We project the attractor reconstructed by the Takens method of delays to a new state space, where the projection of the data is more optimal. (It is known from information theory that this method produces an optimal compression of information.)

The first step is the estimation of the covariance matrix E $R^{m \times m}$ by $E=X^T X$.

The next step is the diagonalisation of the covariance matrix E. Since E is a real symmetric matrix it can be written as the product $E=S\Sigma^2 S^T$, where S is m×m orthonormal and $\Sigma^2$ is m×m diagonal. The columns of S are the singular vectors of X, which form the orthonormal basis for the embedding space. The components of the diagonal matrix $\Sigma^2$ are the squares of the singular values of X, $(\sigma_i)^2$. We can plot a graph of the singular values against their index n, which is called the "singular spectrum". The final reconstructed attractor in state space is defined as a rotation on delay vectors $$Y^T = X^T S$$

It is known that the singular spectrum can be divided into a deterministic part and a noise background, where the deterministic singular values are several orders of magnitude bigger than those in the noise background. If a larger embedding dimension than necessary is used, we will see the difference in magnitude of the deterministic singular values and the noise background. This method is used to choose the appropriate embedding dimension m from experimental data.

This technique presents one of the possible approaches to state space reconstruction. It enables us to establish the minimum number of co-ordinates which form an embedding. Furthermore, it optimally projects data in state space and prepares them for further analyses (for example—computing of correlation dimension).

It is known that problems with this method with sensitive dependence on the window length $\tau_w$ exist. A recommended prescription for a choice of window length $\tau_w$ is:

$$m^*\tau = \tau_w \leq \tau^\circ = 2\pi/W^\circ$$

where $w^\circ$ is the band limiting frequency. As there is no obvious lower bound on $\tau_w$, we can take $\tau_w = \tau^0$. It is then simple to find the appropriate dimension as $$m = 2\pi/\tau w^\circ$$

and to decompose the data in this dimension.

Then we can decompose the data in a very large dimension (60 or 100) and detect differences between big deterministic singular values and low noise background singular values. This criterion gives us the necessary number of co-ordinates for analysed data.

Saturation of System Invariants

System invariants (e.g. correlation dimension) depend on the embedding dimension and this fact can be used in order to determine the embedding dimension. If the attractor is properly unfolded by choosing an embedding dimension m large enough, then any property of the attractor, which depends on distances between points in the state space, should become independent of the value of the dimension, when the necessary embedding dimension is reached. Increasing the dimension further beyond this threshold should not affect the value of these properties. The appropriate embedding dimension can be established as a dimension where the computed invariant has a saturation of its value. Thus by determining the invariants (using known methods) for different dimensions the appropriate embedding dimension can be determined.

False Nearest Neighbours

This method relates to the existence of false crossings of the orbit with itself. These false crossings arise when we project the attractor into a too low dimensional space. The situation happens that two points of the attractor are close to each other only because of false crossing. When we increase the dimension of embedding, the false crossing disappears and the same two points are now in distant places of the attractor. By examining this problem in dimension one, dimension two and then subsequent dimensions, until there are no more false neighbours remaining, one can establish the necessary embedding dimension m. An example of a method for doing this is given in appendix A.

True Vector Fields

It is known that if the dynamics is given by the autonomous rule x->F(x) and F(x) is smooth (differentiable), then the tangents to the evolution of the system are smoothly and uniquely spread throughout the state space. The local vector field has been established by dividing the state space into small volumes and identifying where orbits enter and exit the volumes. This defines the local flow under the assumption that the columns are small enough.

If we analyse the vector field in too small a dimension, the vectors in a field have different directions in the same volume cell and their location is not unique. As we increase the embedding dimension, the frequency of overlap (the different directions of vectors in the volume cells) will fall to zero and the vector field will be unfolded. The dimension, where the different directions of the vectors approach zero, is established as the appropriate embedding dimension m.

A number of advantages are achieved by making use of the invention and these include:

different product designs can be assessed and compared with respect to how easily they are affected by changes in components (e.g. from batch to batch or supplier to supplier)

Measurements taken from products can be used to assess consistency and quality in a practical and effective way. This allows manufacturers to provide product performance and reliability.

Manufacturers are better able to predict the number of products that will be returned.

Poor batch combinations can be identified and described in quantified terms (for example, batch mix and number of units exhibiting change of behaviour).

A range of applications are within the scope of the invention. These include situations in which it is required to predict one or more future values of a series of product data or to analyse product data by determining an attractor structure from a series of product data. For example, to manage and control manufacturing and other types of processes, to analyse such processes when they fail, to improve such processes and to monitor them and provide information about the state of the process. If deliberate changes are made to the process these can be confirmed by the computer system.

APPENDIX A

A method for determining false nearest neighbours is described below: In dimension m each vector $$\{X_i\} = \{(X_i, X_{i+\tau}, X_{i+2\tau}, \ldots, X_{i+(m-1)\tau})\}$$

has a nearest neighbour $X_i^{NN}$ with nearness in the sence of some distance function. Abarbanel used Euclidean distance. The Euclidean distance in dimension m between $X_i$ and $X_i^{NN}$ is called $R_m(i)$:

$$R_m(i)^2 = \{[X_i - X_i^{NN}]^2 + [X_{i+\tau} - X_{i+\tau}^{NN}]^2 + \ldots + [X_{i+(m-1)\tau} - X_{i+(m-1)\tau}^{NN}]^2\}$$

$R_m(i)$ is presumably small when one has a lot of data and for a data set with N samples, this distance is approximately of order $(1/N)^{1/m}$. In dimension m+1 the nearest neighbour distance is change due to the (m+1)st coordinates $X_{1+m\tau}$ and $X_{1+m\tau}^{NN}$ to $$R_{m+1}(i)^2 = R_m(i)^2 + [X_{1+m\tau} - X_{1+m\tau}^{NN}]^2$$

If $R_{m+1}(i)$ is large and $R_m(i)$ was small, we can presume that it is because the nearest neighbours were unprotected away from each other, when we increased dimension from m to m+1. The question is how to decide which neighbours are false. Abarbinel suggested the threshold size $R_T$:

$$\frac{|x_{1+m\tau} - x_{1+m\tau}^{NN}|}{R_m(i)} > R_r$$

and then the nearest neighbours are declared false. He reported that in the range of values $10 \leq R_T \leq 50$ the number of false neighbours identified by this criterion is constant.

$$\frac{\sqrt{R_{m+1}(i)^2 - R_m(i)^2}}{R_m(i)} \geq (10 \div 50)$$

With Such a big range of independence of $R_T$ we have confidence that this is a workable criterion. The results are normally presented in precentage of all samples N.

In the case of clean data (pure data without any, additional noise) from a chaotic system, we expect that the percentage of false nearest neighbours will start from 100% in dimension one and then will quickly drop to zero, when the embedding dimension m is reached. Furthermore, it should remain zero because the attractor is already unfolded.

What is claimed is:

1. A method of predicting a future value of a series of product data measured at irregular time intervals and comprising a plurality of values each measured from a different product, the method comprising the steps of:
   (i) forming a set of vectors wherein each vector comprises a number of successive values of the series of product data;
   (ii) identifying from said set of vectors, a current vector which comprises a most recent value of the series of product data;
   (iii) identifying at least one nearest neighbour vector from said set of vectors, wherein for each nearest neighbour vector a measure of similarity between that nearest neighbour vector and the current vector is less than a threshold value;
   (iv) for each nearest neighbour vector, determining a corresponding vector, each corresponding vector comprising values of the series of product data that are a specified number of data values ahead of the data values of the nearest neighbour vector in said series of product data; and
   (v) calculating the predicted future value of the series of product data on the basis of at least some of the corresponding vector(s).

2. A method as claimed in claim 1 wherein said step (i) of forming a set of vectors further comprises determining an interval value, said interval value being an integer.

3. A method as claimed in claim 2 wherein said interval value is determined on the basis of a local minimum in a graph of average mutual information.

4. A method as claimed in claim 2 wherein said interval value is determined on the basis of a phase portrait.

5. A method as claimed in claim 2 wherein each vector in said set of vectors comprises values that occur at a position in the series that is a fixed number of values along in said series from the values of one other vector of the set, and wherein said fixed number of values is said interval value.

6. A method as claimed in claim 1 wherein two or more corresponding vectors are determined and said step (v) of calculating the predicted future value comprises calculating an average of said corresponding vectors.

7. A method as claimed in claim 6 wherein said average is a weighted average.

8. A method of predicting a future value of a series of product data measured at irregular time intervals and comprising a plurality of values each measured from a different product, the method comprising the steps of:
   (i) forming a set of vectors wherein each vector comprises a number of successive values of the series of product data;
   (ii) identifying from said set of vectors, a current vector which comprises a most recent value of the series of product data;
   (iii) identifying at least one nearest neighbour vector from said set of vectors, wherein for each nearest neighbour vector a measure of similarity between that nearest neighbour vector and the current vector is less than a threshold value;
   (iv) for each nearest neighbour vector, determining a corresponding vector, each corresponding vector comprising values of the series of product data that are a specified number of data values ahead of the data values of the nearest neighbour vector in said series of product data; and
   (v) calculating the predicted future value of the series of product data on the basis of at least some of the corresponding vector(s);
   wherein said step (i) of forming a set of vectors further comprises determining an interval value, said interval value being an integer; and
   wherein said interval value is determined on the basis of a local minimum in a graph of an autocorrelation function.

9. A method as claimed in claim 8 wherein said step (i) of forming a set of vectors further comprises determining how many vectors are required for said set of vectors.

10. A method as claimed in claim 9 wherein said number of required vectors is determined using a method of saturation of system invariants.

11. A method as claimed in claim 9 wherein said number of required vectors is determined on the basis of false nearest neighbour vectors.

12. A method as claimed in claim 9 wherein said number of required vectors is determined on the basis of true vector fields.

13. A method as claimed in claim 8 wherein said step (v) of calculating the predicted future value further comprises the steps of:
   a) for each nearest neighbour vector, determining a second corresponding vector, each second corresponding vector comprising values of the series of product data that are said specified number of data values behind the data values behind the data values of the nearest neighbour vector in said series of product data; and
   b) determining a set of second corresponding vectors for which measure of similarity between each second corresponding vector and a particular vector is less than a threshold value; and
   c) calculating the predicted future value only on the basis of corresponding vectors for which the nearest neighbour vector has a second corresponding vector that is a member of said set of second corresponding vectors.

14. A method as claimed in claim 13 wherein said series of product data comprise a number of measured values of a single parameter.

15. A method as claimed in claim 14 wherein said series of product data comprise values that were measured over time.

16. A method as claimed in claim 15 wherein said measure of similarity comprises a distance.

17. A method as claimed in claim 16 wherein said predicted future value of the series of values is between 1 and 50 values ahead in the series.

18. A method as claimed in claim 17 wherein said predicted future value of the series of values is between 1 and 15 values ahead in the series.

19. A method as claimed in claim 18 wherein said step (v) of calculating the predicted future value further comprises obtaining an actual value corresponding to the predicted value and comparing said actual value with said predicted value.

20. A computer system for predicting a future value of a series of product data measured at irregular time intervals and comprising a plurality of values each measured from a different product, the system comprising:
- (i) a processor arranged to form a set of vectors wherein each vector comprises a number of successive values of the series of product data;
- (ii) an identifier arranged to identify from said set of vectors, a current vector which comprises a most recent value of the series of product data;
- (iii) a second identifier arranged to identify at least one nearest neighbour vector from said set of vectors, wherein for each nearest neighbour vector a measure of similarity between that nearest neighbour vector and the current vector is less than a threshold value;
- (iv) a determiner arranged to determine, for each nearest neighbour vector, a corresponding vector, each corresponding vector comprising values of the series of product data that are a specified number of data values ahead of the data values of the nearest neighbour vector in said series of product data; and
- (v) a calculator arranged to calculating the predicted future value on the basis of at least some of the corresponding vector(s); wherein said series of product data comprises a plurality of values each measured from a different product; wherein said step (i) of forming a set of vectors further comprises determining an interval value, said interval value being an integer; and wherein said interval value is determined on the basis of a local minimum in a graph of an autocorrelation function.

21. An apparatus for controlling a product manufacturing process comprising:
- (i) one or more inputs arranged to receive information about products produced in the manufacturing process said information comprising a series of product data, comprising a plurality of values each measured from a different product; and
- (ii) a computer system for predicting at least one future value of said series of product data as claimed in claim 20.

22. A method of predicting a future value of a series of product data measured at irregular time intervals and comprising a plurality of values each measured from a different product, the method comprising the steps of:
- (i) forming a set of vectors wherein each vector comprises a number of successive values of the series of product data;
- (ii) identifying from said set of vectors, a current vector which comprises a most recent value of the series of product data;
- (iii) identifying at least one nearest neighbour vector from said set of vectors, wherein for each nearest neighbour vector a measure of similarity between that nearest neighbour vector and the current vector is less than a threshold value;
- (iv) for each nearest neighbour vector, determining a corresponding vector, each corresponding vector comprising values of the series of product data that are a specified number of data values ahead of the data values of the nearest neighbour vector in said series of product data; and
- (v) calculating the predicted future value of the series of product data on the basis of at least some of the corresponding vector(s); wherein said step (i) of forming a set of vectors further comprises determining how many vectors are required for said set of vectors; and wherein said required number of vectors is determined using a method of principal component analysis.

* * * * *